US012720193B2

(12) United States Patent
Bossuyt et al.

(10) Patent No.: US 12,720,193 B2
(45) Date of Patent: Aug. 25, 2026

(54) MODE SEQUENCER CIRCUITRY AND MODE SEQUENCING METHOD

(71) Applicant: Sony Semiconductor Solutions Corporation, Kanagawa (JP)

(72) Inventors: Luc Bossuyt, Stuttgart (DE); Varun Arora, Stuttgart (DE); Rachit Mohan, Stuttgart (DE); Gaetan Koers, Stuttgart (DE); Marc Pauwels, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/033,081

(22) PCT Filed: Oct. 27, 2021

(86) PCT No.: PCT/EP2021/079826
§ 371 (c)(1),
(2) Date: Apr. 21, 2023

(87) PCT Pub. No.: WO2022/090311
PCT Pub. Date: May 5, 2022

(65) Prior Publication Data

US 2023/0396879 A1 Dec. 7, 2023

(30) Foreign Application Priority Data

Oct. 30, 2020 (EP) .................................... 20205034

(51) Int. Cl.
*H04N 23/667* (2023.01)
*G06V 10/141* (2022.01)
(Continued)

(52) U.S. Cl.
CPC ......... *H04N 23/667* (2023.01); *G06V 10/141* (2022.01); *G06V 10/25* (2022.01); *H04N 23/611* (2023.01)

(58) Field of Classification Search
CPC .... H04N 23/667; H04N 23/611; G06V 10/25; G06V 10/141
See application file for complete search history.

(56) References Cited

U.S. PATENT DOCUMENTS 5,796,439 A * 8/1998 Hewett ................ H04N 7/0105
348/E7.009
6,026,088 A * 2/2000 Rostoker ........... H04N 21/4381
348/E5.002
(Continued)

FOREIGN PATENT DOCUMENTS

| CN | 106165399 A | 11/2016 |
|---|---|---|
| DE | 102017205386 A1 | 10/2018 |
| KR | 10-2014-0145481 A | 12/2014 |

OTHER PUBLICATIONS

International Search Report and Written Opinion mailed on Feb. 8, 2022, received for PCT Application PCT/EP2021/079826, filed on Oct. 27, 2021, 9 pages.

*Primary Examiner* — Dave Czekaj
*Assistant Examiner* — Shanika M Brumfield
(74) *Attorney, Agent, or Firm* — XSENSUS LLP

(57) ABSTRACT

A mode sequencer circuitry for a time-of-flight system, the time-of-flight system including at least an imaging unit and an illumination unit, the imaging unit having a data bus interface for transmitting data to an application processor over a data bus.

18 Claims, 11 Drawing Sheets

(51) Int. Cl.
*G06V 10/25* (2022.01)
*H04N 23/611* (2023.01)

(56) References Cited

U.S. PATENT DOCUMENTS

| | | | | |
|---|---|---|---|---|
| 6,529,236 | B1 * | 3/2003 | Watanabe | H04N 25/445 348/E3.02 |
| 7,623,152 | B1 * | 11/2009 | Kaplinsky | H04N 23/69 348/211.3 |
| 9,286,657 | B1 | 3/2016 | Thorup, Jr. | |
| 9,773,155 | B2 | 9/2017 | Shotton et al. | |
| 10,611,335 | B2 | 4/2020 | Cech et al. | |
| 2005/0212913 | A1 * | 9/2005 | Richter | G06V 40/161 348/208.14 |
| 2011/0025860 | A1 * | 2/2011 | Katougi | G06T 3/4069 358/3.26 |
| 2014/0253688 | A1 * | 9/2014 | Metz | G01S 7/4915 348/46 |
| 2015/0285625 | A1 | 10/2015 | Deane | |
| 2016/0182895 | A1 | 6/2016 | Ko et al. | |
| 2016/0381311 | A1 * | 12/2016 | Guo | H04N 25/46 348/308 |
| 2019/0058859 | A1 | 2/2019 | Price et al. | |
| 2019/0109977 | A1 | 4/2019 | Dutton et al. | |
| 2019/0166391 | A1 * | 5/2019 | Park | H04N 21/234372 |
| 2019/0250257 | A1 | 8/2019 | Finkelstein et al. | |
| 2020/0218488 | A1 * | 7/2020 | Nguyen | G06F 3/0482 |
| 2021/0216768 | A1 * | 7/2021 | Yi | G01S 7/497 |
| 2023/0239570 | A1 * | 7/2023 | Nagano | H04N 23/73 348/222.1 |

* cited by examiner

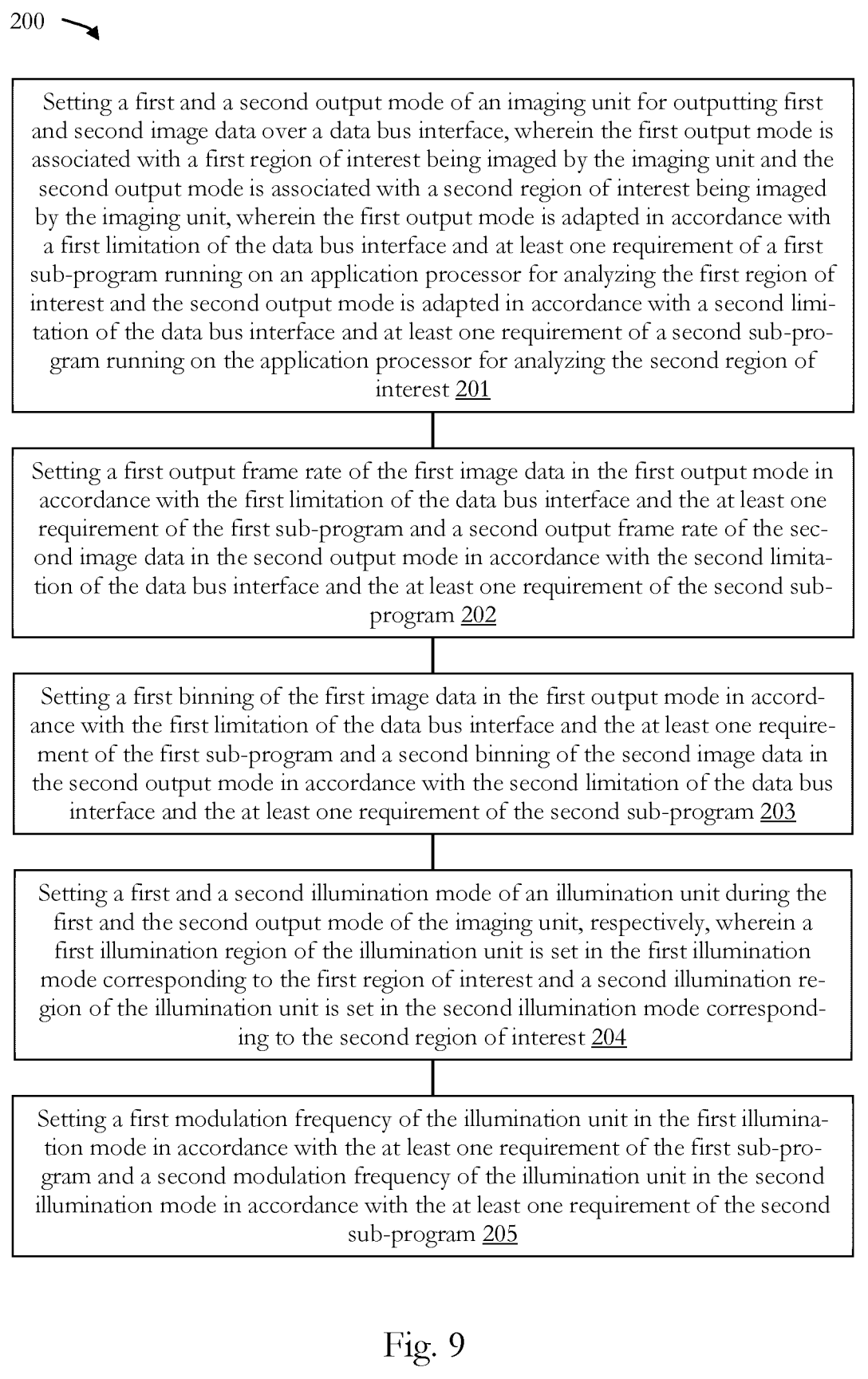

200

Setting a first and a second output mode of an imaging unit for outputting first and second image data over a data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest 201

Setting a first output frame rate of the first image data in the first output mode in accordance with the first limitation of the data bus interface and the at least one requirement of the first sub-program and a second output frame rate of the second image data in the second output mode in accordance with the second limitation of the data bus interface and the at least one requirement of the second sub-program 202

Setting a first binning of the first image data in the first output mode in accordance with the first limitation of the data bus interface and the at least one requirement of the first sub-program and a second binning of the second image data in the second output mode in accordance with the second limitation of the data bus interface and the at least one requirement of the second sub-program 203

Setting a first and a second illumination mode of an illumination unit during the first and the second output mode of the imaging unit, respectively, wherein a first illumination region of the illumination unit is set in the first illumination mode corresponding to the first region of interest and a second illumination region of the illumination unit is set in the second illumination mode corresponding to the second region of interest 204

Setting a first modulation frequency of the illumination unit in the first illumination mode in accordance with the at least one requirement of the first sub-program and a second modulation frequency of the illumination unit in the second illumination mode in accordance with the at least one requirement of the second sub-program 205

Fig. 9

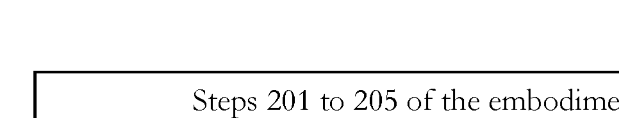

Steps 201 to 205 of the embodiment of Fig. 9 301

Obtaining the first and the second image data in accordance with the first and the second output modes of the imaging unit 302

Calculating first and second component data, based on the obtained first and the obtained second image data 303

Transmitting either the obtained first image data or the calculated first component data in accordance with the first limitation of the data bus interface and the at least one requirement of the first sub-program and either the obtained second image data or the calculated second component data in accordance with the second limitation of the data bus interface and the at least one requirement of the second sub-program 304

Determining the first and the second region of interest, based on the obtained first image data or the first calculated component data and the second image data or the calculated second component data 305

Setting the first and the second region of interest in accordance with the determined first and second region of interest 306

Fig. 10

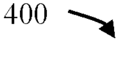
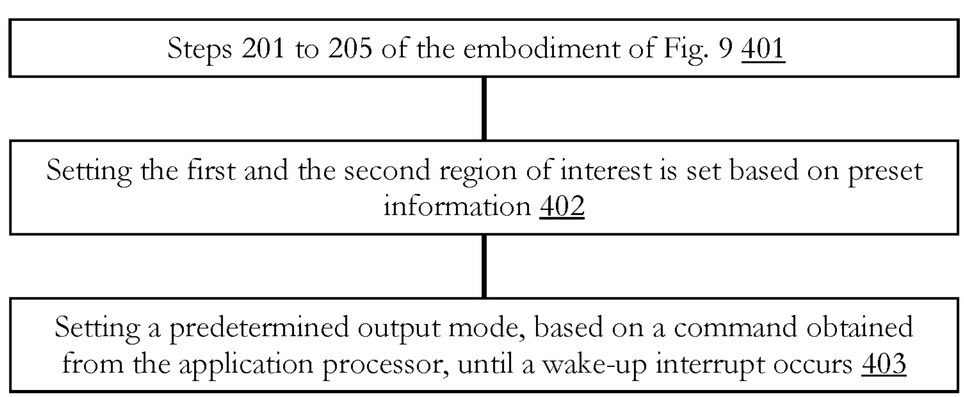
Fig. 11
Steps 201 to 205 of the embodiment of Fig. 9 501
Setting the first and the second region of interest based on tracking information obtained from the application processor 502
Fig. 12

MODE SEQUENCER CIRCUITRY AND MODE SEQUENCING METHOD

CROSS-REFERENCE TO RELATED APPLICATIONS

The present application is based on PCT filing PCT/EP2021/079826, filed Oct. 27, 2021, which claims priority to EP 20205034.0, filed Oct. 30, 2020, the entire contents of each are incorporated herein by reference.

TECHNICAL FIELD

The present disclosure generally pertains to a mode sequencer circuitry for a time-of-flight system and a corresponding mode sequencing method.

TECHNICAL BACKGROUND

Generally, time-of-flight (ToF) devices or systems are known, which are used for determining a distance to objects in a scene or a depth map of (the objects in) the scene that is illuminated with light. Typically, time-of-flight systems include an illumination unit (e.g. an array of light emitting diodes (LED)), optical parts (e.g. lenses) and an imaging unit such as an image sensor (e.g. array of current assisted photonic demodulator (CAPD) pixels) with read-out circuitry and it may include a processing unit (e.g. a processor), for example, when depth information is generated on the ToF device.

Time-of-flight includes a variety of methods that measure the time that, for example, a light wave needs to travel a distance in a medium. Known ToF systems can obtain depth measurements (and depth information) of objects in a scene for every pixel of a depth image captured with an imaging unit. For capturing this depth image, the ToF system typically illuminates the scene with, for instance, a modulated light wave and images the backscattered/reflected light wave with an optical lens portion on the imaging unit. The imaging unit can have, for example, a pixel array, wherein a gain of the pixels of the pixel array is modulated according to a demodulation signal which may be phase-shifted with respect to the modulation of the light wave, thereby generating image data indicative for the distance to the objects in the scene. Typically, the imaging unit outputs the generated image data to a processing unit for image processing and depth information generation.

Although there exist techniques for outputting image data to a processing unit in a time-of-flight system, it is generally desirable to improve the existing techniques.

SUMMARY

According to a first aspect the disclosure provides a mode sequencer circuitry for a time-of-flight system, the time-of-flight system comprising at least an imaging unit and an illumination unit, the imaging unit having a data bus interface for transmitting data to an application processor over a data bus, the mode sequencer circuitry being configured to:

- set a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest.

According to a second aspect the disclosure provides a mode sequencing method for a time-of-flight system, the time-of-flight system including at least an imaging unit and an illumination unit, the imaging unit having a data bus interface for transmitting data to an application processor over a data bus, the mode sequencer method comprising:

- setting a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest.

Further aspects are set forth in the dependent claims, the following description and the drawings.

BRIEF DESCRIPTION OF THE DRAWINGS

Embodiments are explained by way of example with respect to the accompanying drawings, in which:

FIG. 9 schematically illustrates in a flow diagram a first embodiment of a mode sequencing method;

FIG. 10 schematically illustrates in a flow diagram a second embodiment of a mode sequencing method;

FIG. 11 schematically illustrates in a flow diagram a third embodiment of a mode sequencing method;

FIG. 12 schematically illustrates in a flow diagram a fourth embodiment of a mode sequencing method;

DETAILED DESCRIPTION OF EMBODIMENTS

Figure 3:
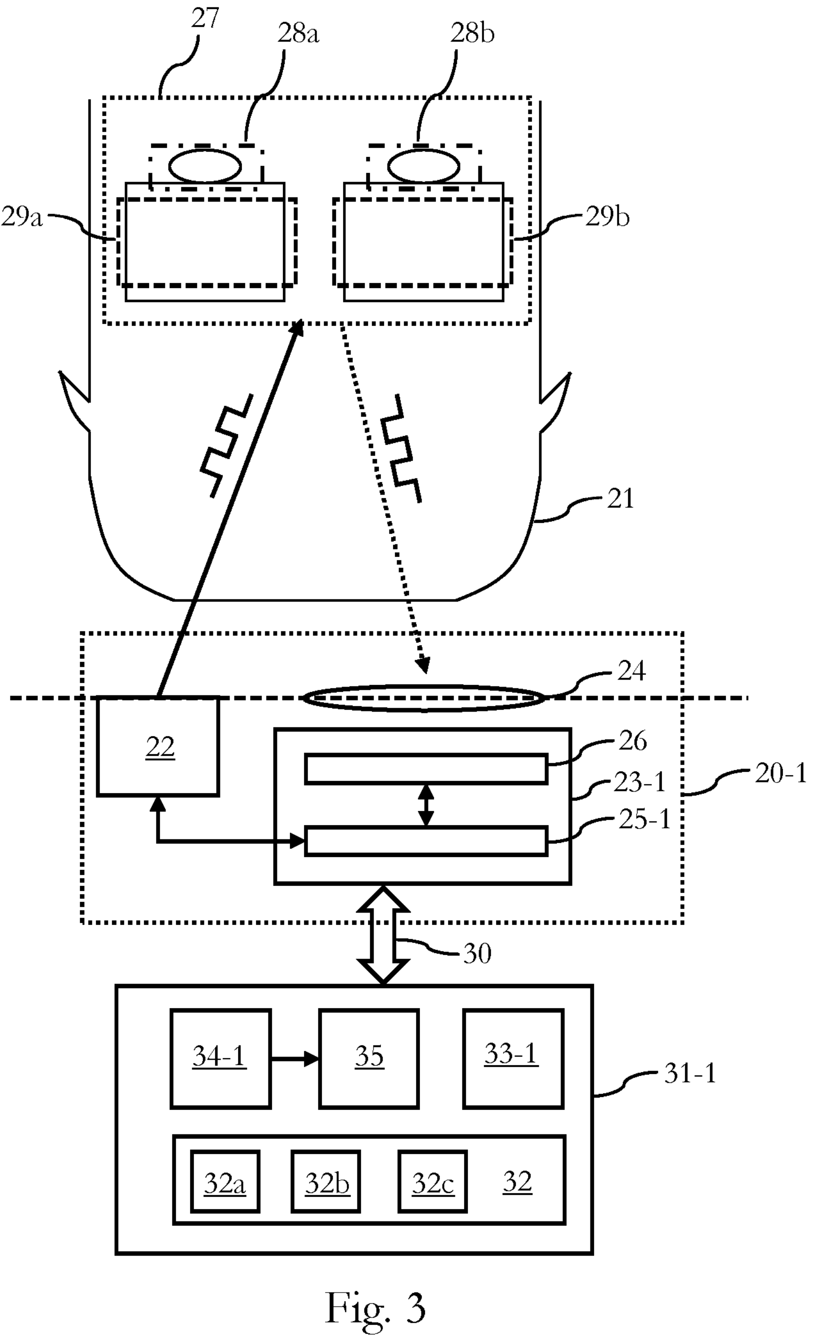
FIG. 3 schematically illustrates in a block diagram a first embodiment of a mode sequencer circuitry for a time-of-flight system.

Before a detailed description of the embodiments under reference of FIG. 3 is given, general explanations are made.

As mentioned in the outset, time-of-flight (ToF) systems are known which can obtain depth measurements (and depth information) of objects in a scene. Such ToF systems may be used in, for example, smartphones for gesture recognition, face recognition, autofocussing and the like or it may be used in automotive applications such as in-cabin monitoring of passengers for driver assistance systems, gesture-based operation of infotainment systems or the like.

For capturing the depth image, in some embodiments, the ToF system illuminates the scene with a modulated light wave and images reflected light wave with an optical lens portion on an imaging unit. The imaging unit includes, in some embodiments, a pixel array in which a gain of the pixels of the pixel array is modulated according to a demodulation signal, thereby generating image data indicative for a distance to the objects in the scene. Such ToF systems are called indirect ToF (iToF) systems.

Figure 1:
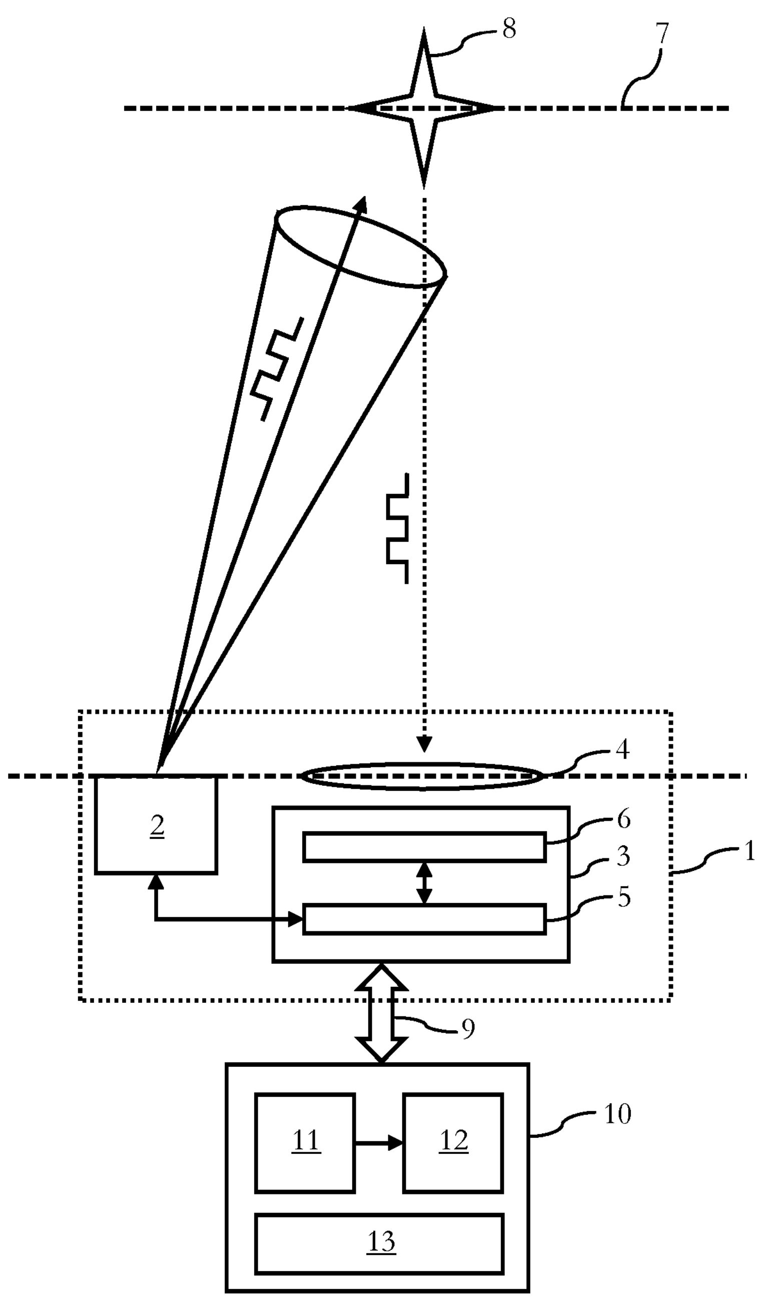
FIG. 1 schematically illustrates in a block diagram an embodiment of a time-of-flight system.

For enhancing the general understanding of the present disclosure, an embodiment of an iToF system 1 is discussed under reference of FIG. 1, there the embodiment of the iToF system 1 is schematically illustrated in a block diagram.

The iToF system 1 is a frill-field iToF system for providing a distance measurement. The iToF system 1 includes an illumination unit 2, an imaging unit 3 and an optical lens portion 4. The iToF system 1 in this embodiment is integrated in a mobile device such as a smartphone.

The imaging unit 3 includes a control unit 5 and an image sensor 6.

The illumination unit 2, including a light source such as an LED array, emits intensity-modulated light (in time) to a scene 7 (illuminates the scene 7) including an object 8, which reflects at least part of the (illumination) light. The reflected light from the object 8 is imaged by the optical lens portion 4 onto the image sensor 6 (or the imaging unit 3).

The control unit 5 controls the overall operation of the ToF system 1. The control unit 5 controls the light emission timing of the illumination unit 2 based on a modulation signal (which may be e.g. a rectangular modulation signal having a modulation period T, i.e. a modulation frequency fmod=1/T) provided to the illumination unit 2. The control unit 5 applies a demodulation signal to the image sensor 6 which corresponds to the modulation signal provided to the illumination unit 2.

The image sensor 6 generates image data including pixel values of a plurality of pixels in accordance with an amount of reflected light imaged by the optical lens portion 4 onto each of the pixels and in accordance with the demodulation signal. The control unit 5 reads out the image data generated by the image sensor 6.

The imaging unit 3 has a data bus interface for transmitting the generated image data over a data bus 9 to an application processor 10 of the mobile device (generally, the application processor 10 may be replaced by an FPGA, an ISP or the like in other embodiments).

The application processor 10 includes an image processing unit 11, a 3D image reconstruction unit 12 and an application unit 13.

The image processing unit 11 obtains the image data transmitted from the imaging unit 3 over the data bus 9. The image processing unit 11 determines, based on the obtained image data, a phase-shift of the detected reflected light with respect to the emitted light. Then, the image processing unit 11 calculates a distance d or generally depth information for the scene 7, for example, to the object 8 based on the determined phase-shift.

As generally known, the (unambiguous) range of a distance measurement of an iToF system is given by:

$$\text{range} = \frac{T \cdot c}{2} = \frac{c}{2f\,\text{mod}}.$$

Here, c is the speed of light, T is the modulation period of the modulation signal and fmod is the modulation frequency.

Figure 2:
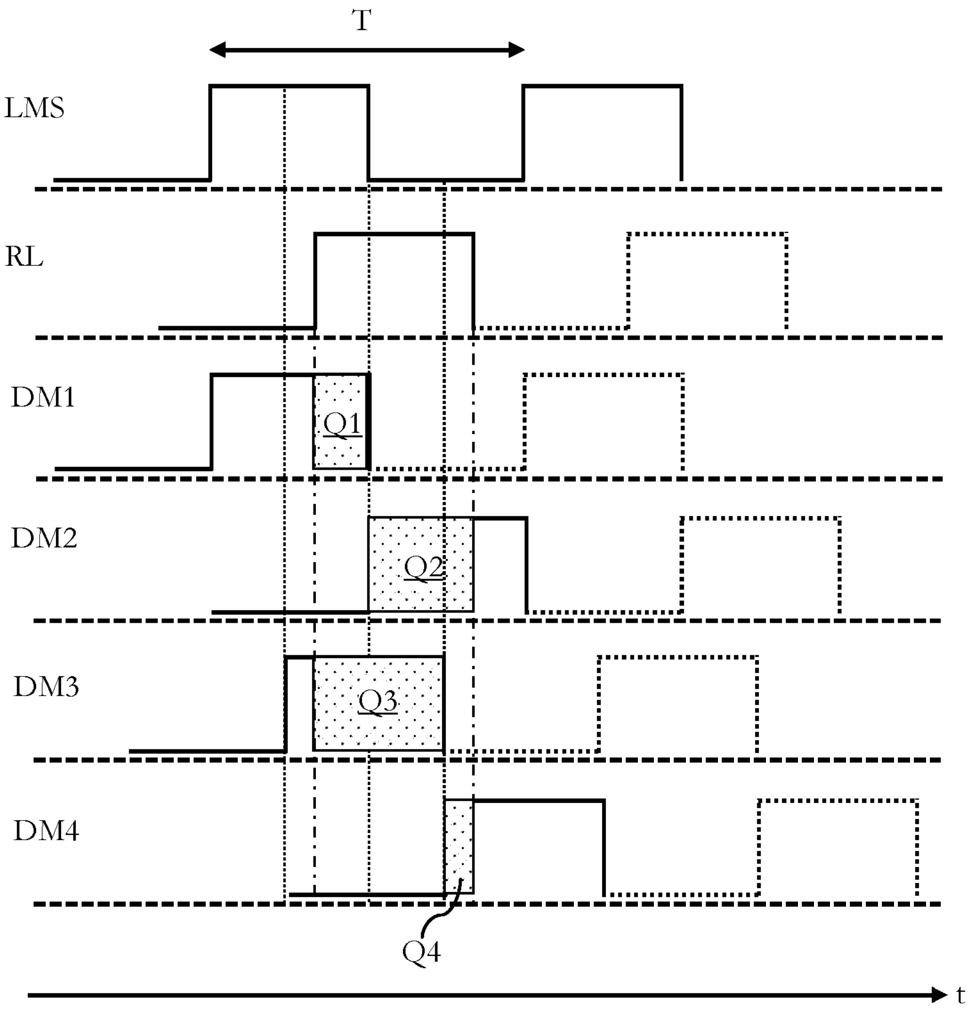
FIG. 2 schematically illustrates an embodiment of a light modulation signal of an illumination unit, a reflected light signal and four demodulation signals.

For further enhancing the general understanding of the present disclosure, the underlying principle of determining the phase-shift and calculating the distance or depth information is discussed with reference to FIG. 1 and FIG. 2 which also applies to other embodiments herein, wherein FIG. 2 schematically illustrates an embodiment of a light modulation signal LMS of the illumination unit 2, a reflected light signal RL and four demodulation signals DM1-DM4.

The light modulation signal LMS of the illumination unit 2 is a rectangular modulation signal with a modulation period T (or corresponding modulation frequency fmod). An intensity of emitted light of the light source is modulated in time according to the light modulation signal LMS. The emitted light is reflected at the object 8 in the scene 7.

The reflected light signal RL is an intensity of the reflected light at the image sensor 6, which is phase-shifted with respect to the light modulation signal LMS and varies according to the intensity-modulation of the emitted light. The phase is proportional to a distance to the object 8 in the scene 7.

The image sensor 6 captures four frames of image data corresponding to the demodulation signals DM1, DM2, DM3 and DM4, wherein the four frames may be transmitted individually over the data bus 9 to the application processor or in a packet (then, the imaging unit 3 stores the four frames prior to transmission).

The demodulation signal DM1 is phase-shifted by 0° with respect to the light modulation signal LMS. When the demodulation signal DM1 is high, the image sensor 6 (each of the plurality of pixels) accumulates an electrical charge Q1 in accordance with an amount of light incident on the respective pixel and an overlap of the reflected light signal RL and the demodulation signal DM1.

The demodulation signal DM2 is phase-shifted by 90° with respect to the light modulation signal LMS. When the demodulation signal DM2 is high, the image sensor 6 (each of the plurality of pixels) accumulates an electrical charge Q2 in accordance with an amount of light incident on the respective pixel and an overlap of the reflected light signal RL and the demodulation signal DM2.

The demodulation signal DM3 is phase-shifted by 180° with respect to the light modulation signal LMS. When the demodulation signal DM3 is high, the image sensor 6 (each of the plurality of pixels) accumulates an electrical charge Q3 in accordance with an amount of light incident on the respective pixel and an overlap of the reflected light signal RL and the demodulation signal DM3.

The demodulation signal DM4 is phase-shifted by 270° with respect to the light modulation signal LMS. When the demodulation signal DM4 is high, the image sensor 6 (each of the plurality of pixels) accumulates an electrical charge Q4 in accordance with an amount of light incident on the respective pixel and an overlap of the reflected light signal RL and the demodulation signal DM4.

The electrical charges Q1, Q2, Q3 and Q4, as generally known, are proportional to, e.g., a voltage signal (electric signal) of the respective pixel from which pixel values (digital values) are obtained and output by the image sensor as the image data and, thus, the electrical charges Q1, Q2, Q3 and Q4 are representative for the pixel values.

Then, the phase is given by:

$$\text{phase} = \arctan\left(\frac{Q3 - Q4}{Q1 - Q2}\right) = \arctan\left(\frac{Q}{I}\right),$$

$$Q = Q3 - Q4,$$

$$I = Q1 - Q2.$$

Here, Q is a quadrature component and I is an in-phase component, which are both component values of a pixel (IQ value) which together are component data.

Then, the distance d to the object is given by:

$$d = \frac{1}{2\pi}\cdot\text{range}\cdot\text{phase}.$$

The amplitude of the light reflected signal RL is proportional to the phase amplitude value, wherein the phase amplitude value (amplitude) is given by:

$$\text{amplitude}=\sqrt{I^2+Q^2}.$$

Typically, a measurement accuracy may increase with higher amplitude and higher modulation frequency.

Returning back to FIG. 1, the depth information (distance) for the scene 7 is fed from the image processing unit 11 to the 3D image reconstruction unit 12, which constructs (generates) a 3D image, 3D depth map or 3D point cloud of the scene 7 based on the depth information from the image processing unit 11.

The application unit 13 implements various high-level functions such as gesture recognition, face recognition or autofocusing based on the generated depth information or depth map. Other functions of the application unit 13 may include memory management, graphics processing, multimedia decoding and encoding, etc.

However, in such embodiments, it has been recognized that the data amount of the image data which must be transmitted over the data bus is large when the data flows with full resolution to the application processor.

It has thus been recognized that it may require a high data bandwidth to the application (e.g. >5 Gbps) in order to achieve a certain desired output frame rate (e.g. 60 fps), robustness against motion artifacts and low latency (e.g. <10 ms).

It has further been recognized that for calculating the component data, for example, four or more full image data frames must be stored temporarily in memory which puts a high load on a memory bus of the application processor. It further puts a high computational load on the application processor which must additionally calculate the depth map, perform e.g. gesture recognition and manage multiple other functions.

Moreover, it has been recognized that different applications or sub-programs (e.g. gesture and face recognition for unlocking a mobile device or operating the mobile device) analyzing the image data and the depth information have different requirements concerning output resolution, field-of-view or region of interest, output frame rate, etc. for ensuring reliable feature detection.

Furthermore, it has been recognized that, for example, in automotive applications, such as in-cabin passenger monitoring, a sequence of sub-programs of the application analyzing the image data is repeatedly performed each having different minimum requirements on the image data resolution, frame rate and data type (like depth, or infrared intensity). Additionally, the sequence of sub-programs may depend on a state of a vehicle (e.g. parking or driving) in which the in-cabin monitoring is performed.

It has thus been recognized that an optimization along the processing chain may reduce bandwidth requirements of the data bus, memory bus load and computational load by adapting image data output in accordance with minimum requirements of applications or sub-programs of an application program analyzing the image data and in accordance with limitations of the data bus over which the image data is transmitted to the application processor.

Hence, some embodiments pertain to a mode sequencer circuitry for a time-of-flight system, the time-of-flight system including at least an imaging unit and an illumination unit, the imaging unit having a data bus interface for transmitting data to an application processor over a data bus, wherein the mode sequencer circuitry is configured to:

set a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest.

The mode sequencer circuitry may be included or may be part of the time-of-flight system. The mode sequencer circuitry may be included or may be part of a separate electronic device connected to the application processor or the time-of-flight system. The mode sequencer circuitry may be embedded in a control unit included in the time-of-flight system. The mode sequencer circuitry may be implemented in or may be part of the imaging unit, which may allow the mode sequencer circuitry to run without software intervention, thereby off-loading the application processor and the data bus interface between the application processor and the imaging unit. In some embodiments, this may further reduce required components, for example, when the mode sequencer circuitry further controls the illumination unit to a large extent.

The mode sequencer circuitry may be based on or may include or may be implemented as integrated circuitry logic or may be implemented by a CPU (central processing unit), an application processor, a graphical processing unit (GPU), a microcontroller, an FPGA (field programmable gate array), an ASIC (application specific integrated circuit) or the like.

The functionality may be implemented by software executed by a processor such as an application processor or the like.

Generally, hardware-based control may enable high determinism for video applications due to high timing accuracies (for example only, in the order of 1 microsecond or less).

The mode sequencer circuitry may be based on or may include or may be implemented by typical electronic components configured to achieve the functionality as described herein.

The mode sequencer circuitry may be based on or may include or may be implemented in parts by typical electronic components and integrated circuitry logic and in parts by software.

The mode sequencer circuitry may include a data bus interface for transmitting (and receiving) data over a data bus.

The data bus interface may be a Camera Serial Interface (CSI) in accordance with MIPI (Mobile Industry Processor Interface) specifications (e.g. MIPII CSI-2 or the like), an $I^2C$ (Inter-Integrated Circuit) interface, a Controller Area Network (CAN) bus interface, an FDP-link (Flat Panel Display link), a GSML (Gigabit Multimedia Serial Link), etc. The data bus is in accordance with the corresponding interface specifications.

In some embodiments, the data bus (interface) includes the bus between the imaging unit and the application processor for transmitting the data over the data bus.

The data bus interface may further include a memory bus inside the application processor. Thus, in some embodiments, the data bus (interface) includes the bus between the imaging unit and the application processor and the memory bus inside the application processor.

The mode sequencer circuitry may include a communication interface configured to communicate and exchange data with a computer or processor (e.g. an application processor) over a network (e.g. the internet) via a wired or a wireless connection such as a mobile telecommunications system which may be based on UMTS, LTE or the like (and implements corresponding communication protocols).

The mode sequencer circuitry may include data storage capabilities to store data such as memory which may be based on semiconductor storage technology (e.g. RAM, EPROM, etc.) or magnetic storage technology (e.g. a hard disk drive) or the like.

The time-of-flight (hereinafter: ToF) system may be an indirect ToF system including a full-field iToF system or may be a spot iToF system. The ToF system may embedded in a mobile device (e.g. a smartphone) for, e.g., gesture recognition, in a vehicle (e.g. in a cabin of a car) for in-cabin passenger monitoring, etc.

The ToF system includes at least an illumination unit and an imaging unit.

The illumination unit includes a light source.

The light source may be a laser (e.g. a laser diode) or a plurality of lasers (e.g. a plurality of laser diodes arranged in rows and columns as an array), a light emitting diode (LED) or a plurality of LEDs (e.g. a plurality of LEDs arranged in rows and columns as an array), or the like. The illumination unit may emit visible light or infrared red, or the like.

The illumination unit (or the light source in the illumination unit) is configured to emit light towards a scene or to illuminate the scene.

The illumination unit may be configured to control each laser diode or each LED of an array individually for controlling a (spatial) region of the scene that is illuminated. The illumination unit may include optical elements such as an optical lens portion, diffractive optical elements, etc. for imaging the emitted light onto the scene or to illuminate the scene. The illumination unit may be controlled by the imaging unit.

The illumination unit is configured to modulate an intensity of the emitted light (in time) according to a modulation signal (e.g. by modulating a current or voltage).

The illumination unit may receive the modulation signal (or modulation signal information indicating the modulation signal) from the imaging unit. The illumination unit may be configured to generate the modulation signal (e.g. preconfigured or based on the modulation information). The illumination unit may be configured to output the modulation signal.

The modulation signal may be a sinusoidal modulation signal with a predetermined frequency (modulation frequency), a rectangular modulation signal with a predetermined frequency (modulation frequency), e.g., the emitted light is turned on for a first predetermined time period, then turned off for a second predetermined time period and so on, as generally known, or the like.

The imaging unit includes an image sensor.

The imaging unit includes a control unit (which may be based on or may be implemented or may include integrated circuit logic, an FPGA, an ASIC, typical electronic components, etc. to achieve the functions described herein, or in parts by software and in parts by electronic components) including, for instance, read-out circuitry for the image sensor, circuitry for generating modulation and demodulation signals, circuitry for setting output modes, etc.

The control unit of the imaging unit may control light emission (spatially and in time) of the illumination unit.

Generally, the image sensor included in the imaging unit generates image data of a plurality of pixels representing a ToF measurement of light reflected from the scene that is illuminated with the emitted light from the illumination unit.

The imaging unit is configured to output the generated image data.

The image sensor may include a pixel circuitry having the plurality of pixels (arranged according to a predetermined pattern, e.g., in rows and columns as an array in the image sensor) generating an electric signal in accordance with an amount of light incident onto each of the plurality of pixels and in accordance with a demodulation signal which modulates, for example, a gain of the plurality of pixels, wherein the demodulation signal corresponds to the modulation signal of or for the illumination unit or light source. The demodulation signal for the image sensor may be phase-shifted with respect to the modulation signal of the light source, as generally known for ToF systems.

The plurality of pixels may be current assisted photonic demodulator (CAPD) pixels, photodiode pixels or active pixels based on, for example, CMOS (complementary metal oxide semiconductor) technology etc., wherein, for example, a gain of the plurality of pixels is modulated based on the demodulation signal.

The plurality of pixels may be multi-phase pixels, wherein each multi-phase pixel may include, for example, four subpixel areas (e.g. CAPD subpixel areas) which are demodulated with four different demodulation signals (e.g. phase-shifted with 0°, 90°, 180° and 270° with respect to the modulation signal of the light source).

Generally, the image data may be based on or may include digital values (pixel values) obtained from an analog signal (electric signal, e.g., a voltage or current signal) generated by the plurality of pixels of the image sensor in the imaging unit in accordance with the amount of light incident onto each of the plurality of pixels and in accordance with the demodulation signal.

The image data includes pixel values of the plurality of pixels generated for different demodulation signals with respect to a phase-shift of the demodulation signals. For example, a first demodulation signal may have a phase-shift of 0° with respect to the modulation signal of the illumination unit or light source and a second demodulation signal may have a phase-shift of 90° with respect to the modulation signal of the illumination unit or the light source.

In some embodiments, the image data includes pixel values of the plurality of pixels corresponding to four different demodulation signals having a phase-shift 0°, 90°, 180° and 270°, respectively, with respect to the modulation signal of the light source. Of course, the present disclosure is neither limited to the number of phase shifts, i.e. demodulation signals, nor limited to the specific amounts of phase-shifts, but, in principle, any number of phase-shifts and any amount of phase-shift can be realized.

Hence, the image data may include image data of a plurality of frames. For example, the image data may include pixel values of the plurality of pixels of four frames, wherein a first frame corresponds to a demodulation signal having a phase-shift of 0° with respect to the modulation signal of the light source, a second frame corresponds to a demodulation signal having a phase-shift of 90° with respect to the modulation signal of the light source, a third frame corresponds to a demodulation signal having a phase-shift of 180° with respect to the modulation signal of the light source and a fourth frame corresponds to a demodulation signal having a phase-shift of 270° with respect to the modulation signal of the light source.

Alternatively, the image data may include image data of one frame. For example, a multi-phase sensor may output image data for each of sub-pixel areas including pixel values corresponding to different demodulation signals (e.g. phase-shifted with 0°, 90°, 180° and 270° with respect to the modulation signal of the light source).

The imaging unit has a data bus interface for transmitting data to an application processor over a data bus.

The data bus interface may be a Camera Serial Interface (CSI) in accordance with MIPI (Mobile Industry Processor Interface) specifications (e.g. MIPII CSI-2 or the like), an $I^2C$ (Inter-Integrated Circuit) interface, a Controller Area Network (CAN) bus interface, etc. The data bus is in accordance with the corresponding interface specifications.

The mode sequencer circuitry is configured to set a first and a second output mode of the imaging unit for outputting first and second image data over the data bus interface, wherein the first output mode is associated with a first region of interest being imaged by the imaging unit and the second output mode is associated with a second region of interest being imaged by the imaging unit.

Basically, an output mode of the imaging unit is characterized by output mode parameters which include a region of interest associated with the output mode and may include an output frame rate, a binning (such as a binning of pixel values of neighboring pixels), and an image data output format (pixel values (included in image data) or component values), an illumination control (such as light power, emission waveform, emission wavelength).

Generally, a region of interest is a region in a scene (the scene that is illuminated by the illumination unit) that is imaged by the imaging unit and analyzed, e.g., by a specific computer program or application program for obtaining information about objects (including persons) in the region of interest (e.g. face region of a person for obtaining face information for face recognition). A certain region of interest imaged by the imaging unit is associated with a certain pixel area of the image sensor in the imaging unit and, thus, image data corresponding to the certain pixel area is analyzed when the certain region of interest is analyzed. Different regions of interest may at least partially overlap and, thus, corresponding pixel areas may at least partially overlap without fully overlapping (different regions of interest are not entirely the same). A region of interest may include more than one region (and associated pixel area), e.g., the region of interest may include a region in a left part of the scene and a region in a right part of the scene.

For example, a region of interest may be a full scene (full field-of-view imaged by the imaging unit) and, thus, a full pixel area of the image sensor corresponds to the region of interest. For example, a region of interest may be a center region of a scene and, thus, a center region of the full pixel area including only a subset of pixels in the center region of the image sensor corresponds to the region of interest.

Setting the first output mode may include transmitting at least one bit or a command indicating the first output mode to the imaging unit which is set accordingly. Setting the second output mode may include transmitting at least one bit or a command indicating the second output mode to the imaging unit which is set accordingly.

Setting the first output mode may include transmitting the output mode parameters (region of interest (associated pixel area), output frame rate, binning, image data output format) of the first output mode to the imaging unit which are set accordingly. Setting the second output mode may include transmitting the output mode parameters (region of interest (associated pixel area), output frame rate, binning, image data output format) of the second output mode to the imaging unit which are set accordingly.

The at least one bits, the commands or the output mode parameters for the first and second output mode may be transmitted one after another prior to setting the respective output mode. The at least one bits, the commands or the output mode parameters for the first and second output mode may be transmitted together in a sequence indicating a sequence of output modes which are set in time according to the sequence.

Setting the first output mode may include setting of at least one bit indicating the first output mode stored in the imaging unit. Setting the second output mode may include setting of at least one bit indicating the second output mode stored in the imaging unit.

Setting the first output mode may include setting the output mode parameters (region of interest (associated pixel area), output frame rate, binning, image data output format) of the first output mode stored in the imaging unit. Setting the second output mode may include setting the output mode parameters (region of interest (associated pixel area), output frame rate, binning, image data output format) of the second output mode stored in the imaging unit.

The at least one bits or the output mode parameters for the first and second output mode may be set one after another prior to the respective output mode. The at least one bits or the output mode parameters for the first and second output mode may be set together in a stored sequence indicating a sequence of output modes which are set in time according to the stored sequence.

Setting the first and the second output mode may include setting two register tables and a trigger: setting a first register table indicating each output mode (e.g. modes A, B, C with their respective output mode parameters), setting a second register table indicating a sequence of the output modes (e.g. A B C B) to be repeated N (positive integer) times or ad libitum and triggering a pin or a register to start the sequence. This may reduce interaction with the application processor.

In the first output mode, first image data which is associated with the first region of interest imaged by the imaging unit is output over the data bus interface. In the second output mode, second image data which is associated with the second region of interest imaged by the imaging unit is output over the data bus interface.

Hence, the first image data is output in accordance with the first output mode and the second image data is output in accordance with the second output mode.

The first output mode is adapted in accordance with a first limitation of the data bus interface and at least one requirement of a first sub-program running on an application processor for analyzing the first region of interest. The second output mode is adapted in accordance with a second limitation of the data bus interface and at last one requirement of a second sub-program running on the application processor for analyzing the second region of interest.

The first limitation and the second limitation may be or include at least one of a bandwidth of the data bus (interface), a clock rate of the data bus (interface), a data bus width, (e.g. 16 bits, 32 bits, etc.), or the like.

Generally, the data bus (interface) has a limitation with respect to a maximum data amount (e.g. image data amount) that can be transmitted within a certain time over the data bus (interface). This limitation may be based on the bandwidth, the clock rate or the data bus width or a combination thereof.

Hence, in some embodiments, the first limitation and the second limitation are the same limitation, which is the limitation of the maximum data amount that can be transmitted over the data bus within a certain time.

The first sub-program and the second sub-program are sub-programs or functions of an application program running on the application processor. The application program on the application processor analyzes the image data indicating depth information obtained from the imaging unit over the data bus for obtaining information about objects in a scene illuminated by the illumination unit and performs higher level functions based on the information about the objects in the scene.

The first sub-program analyzes the first region of interest for obtaining information about objects in the first region of interest in the scene. Analyzing may include, for example, depth map calculation, object detection, object tracking, gesture recognition of a person, face recognition, or the like. The first sub-program returns the information to the application program.

The second sub-program analyzes the second region of interest for obtaining information about objects in the second region of interest in the scene. Analyzing may include, for example, depth map calculation, object detection, object tracking, gesture recognition of a person, face recognition, or the like. The second sub-program returns the information to the application program.

The application program may perform higher level functions based on an analysis result (the returned information) of the first sub-program and the second sub-program. For example, when the application program is a program for unlocking a mobile device based on a face identity and a specific gesture, the first sub-program for face identity recognition may return a result whether face identity is confirmed and the second sub-program may return a result whether the specific gesture is confirmed and the application program may unlock the mobile device and its functions based on the results of the first and the second sub-program.

The application program, the first sub-program and the second sub-program (and the associated regions of interest) may depend on a state of a device or a vehicle in which the application processor, the ToF system and the mode sequencer circuitry are embedded. For example, the vehicle may park and, thus, other application programs may be carried out as in a case where the vehicle is driving.

The at least one requirement of the first sub-program and the second sub-program may be a frame rate of the image data (time resolution), a spatial resolution and a depth resolution of the image data. For example, face recognition may require a slower frame rate of the image data than gesture recognition but may require a higher spatial resolution.

Generally, as mentioned above, the data bus has the limitation that the data amount that can be transmitted over the data bus within a certain time is limited. Thus, taking into account at least one requirements of a sub-program, the data amount transmitted over the data bus for the sub-program can be optimized and timed (under the limitation of the maximum possible data amount) by making a trade-off between time resolution, spatial resolution and depth resolution of the image data. In other words, the output mode of the imaging unit is adapted in accordance with the limitation of the data bus and the requirement of the sub-program.

Generally, the limitations may arise from several factors such as physical bandwidth of the iToF sensor-application processor interface, assignment of designated time slots for iTOF sensor (imaging unit) in a case of sensor fusion (e.g. iTOF+RGB), other (non-iTOF related) applications running on the application processor that require low-latency memory access.

Thus, in some embodiments, adapting the first output mode and the second output mode may include adapting an output frame rate (time resolution) and a binning of the image data (spatial resolution).

Accordingly, in the first output mode, only the image data corresponding to the first region of interest imaged by the imaging unit is output over the data bus to the application processor. Moreover, in the first output mode, the image data may be output in accordance with a first output frame rate and a first binning.

Accordingly, in the second output mode, only the image data corresponding to the second region of interest imaged by the imaging unit is output over the data bus to the application processor. Moreover, in the second output mode, the image data may be output in accordance with a second output frame rate and a second binning.

Hence, in some embodiments, a first output frame rate of the first image data is set in the first output mode in accordance with the first limitation of the data bus interface and the at least one requirement of the first sub-program and a second output frame rate of the second image data is set in the second output mode in accordance with the second limitation of the data bus interface and the at least one requirement of the second sub-program.

Thus, in some embodiments, a first binning of the first image data is set in the first output mode in accordance with the first limitation of the data bus interface and the at least one requirement of the first sub-program and a second binning of the second image data is set in the second output mode in accordance with the second limitation of the data bus interface and the at least one requirement of the second sub-program.

Binning is generally known to the skilled person and includes a combination of electrical signals of a cluster of pixels or a combination of pixel values of a cluster of pixels into a single electrical signal or a single pixel value, thereby forming, e.g., blocks of pixels. The first binning and the second binning may thus be achieved by analog or by digital binning. Analog binning may be achieved by, for instance, parallel read-out of multiple rows (e.g. two rows) and multiple columns (e.g. two columns, resulting in a 2×2 binning), wherein, for example, electrical signals of two row pixels of each column are simultaneously put on a column line and the combined electric signals on the column lines are also combined by, for example, connected capacitances. Digital binning may be achieved by digitally averaging pixel values of binned pixels.

Hence, adapting the output mode of the imaging unit accordingly may decrease the data amount of the image data transmitted over the data bus (interface) to the application processor and, thus, may decrease required bandwidth of the data bus interface, a load on a memory bus of the application processor, a computational load of the application processor and overall power consumption.

It has further been recognized that during the first output mode and the second output mode only the first region interest and the second region of interest may need to be illuminated by the illumination unit, since only these regions in the scene are used for analysis.

Hence, in some embodiments, the mode sequencer circuitry is further configured to set a first and a second illumination mode of the illumination unit during the first and the second output mode of the imaging unit, respectively, wherein a first illumination region of the illumination unit is set in the first illumination mode corresponding to the first region of interest and a second illumination region of the illumination unit is set in the second illumination mode corresponding to the second region of interest.

Basically, the first and the second illumination mode of the illumination unit is characterized by the first and second illumination region and may be further characterized by a modulation frequency.

The first and the second illumination region are regions of a scene which are illuminated and correspond to the first and second region of interest, respectively. The first and the second illumination region may be adapted, for example, by moving optical elements (e.g. an optical lens portion) or by switching individual LEDs of an LED array ON and OFF such that the respective first and second region of interest is illuminated.

Setting the first and the second illumination mode may include transmitting illumination mode parameters (region of interest information, modulation frequency (modulation signals or modulation signal information)) or the like to the illumination unit from the imaging unit.

As only the regions corresponding to the regions of interests are illuminated, this may reduce overall power consumption.

In some embodiments, a first modulation frequency of the illumination unit is set in the first illumination mode in accordance with the at least one requirement of the first sub-program and a second modulation frequency of the illumination unit is set in the second illumination mode in accordance with the at least one requirement of the second sub-program.

As mentioned above, different sub-programs may require different depth resolution and, thus, different modulation frequencies of the illumination unit may be required.

This may reduce overall power consumption, since for sub-programs requiring a lower depth resolution, the modulation frequency may be set lower and, thus, losses in the illumination unit (in the light source of the illumination unit) and in the imaging unit (in the pixels of the image sensor) due to fast switching frequencies of currents or voltages in accordance with the light modulation signal and demodulation signal may be reduced, respectively.

In some embodiments, the mode sequencer circuitry is further configured to:

obtain the first and the second image data in accordance with the first and the second output modes of the imaging unit;

calculate first and second component data, based on the obtained first and the obtained second image data; and transmit either the obtained first image data or the calculated first component data in accordance with the first limitation of the data bus interface and the at least one requirement of the first sub-program and either the obtained second image data or the calculated second component data in accordance with the second limitation of the data bus interface and the at least one requirement of the second sub-program.

In such embodiments, the mode sequencer circuitry is part of the ToF system or the imaging unit of the ToF system.

Calculating the first and second component data is generally known, and the component data may be calculated as discussed under reference of FIG. 2 above.

Transmitting either image data or component data in the first and second output mode may reduce the data amount transmitted over the data bus, a load on a memory bus of the application processor, a computational load of the application processor and overall power consumption.

In some embodiments, the mode sequencer circuitry is further configured to set a predetermined output mode, based on a command obtained from the application processor, until a wake-up interrupt occurs.

The predetermined output mode is characterized by output mode parameters which include a region of interest associated with the predetermined output mode and may include an output frame rate, a binning (such as a binning of pixel values of neighboring pixels), and an image data output format (pixel values (included in image data) or component values). In some embodiments, the mode sequencer circuitry is further configured to set also a predetermined illumination mode during the predetermined output mode.

The command may include at least one bit indicating the predetermined output mode or the output mode parameters.

The application processor may transmit the command in response to a state change of a device or a vehicle in which the ToF system and the mode sequencer circuitry is embedded. For example, a mobile device may switch to a sleep mode when the mobile device has not been used for a predetermined time and in response to switching to the sleep mode the command may be issued and transmitted. In this example, the wake-up interrupt may occur in response to another state change, for example, when the mobile device is used again.

In some embodiments, the first and the second region of interest is set based on preset information. In such embodiments, the first and the second region of interest are static and preset.

In some embodiments, the first and the second region of interest is set based on tracking information obtained from the application processor. In such embodiments, the first and the second sub-program or the application program including them, analyzes a size and a movement of objects and persons in the respective region of interest (determine tracking information) and determines the region of interests based on the size and the movement of the objects and persons. The corresponding pixel areas are set accordingly.

This may adapt the first and second region of interest in accordance with the at least one requirement of the respective sub-programs and, thus, may reduce the data amount transmitted over the data bus, etc.

In some embodiments, the mode sequencer circuitry is further configured to:

determine the first and the second region of interest, based on the obtained first image data or the first calculated component data and the second image data or the calculated second component data; and set the first and the second region of interest in accordance with the determined first and second region of interest.

In such embodiments, the mode sequencer circuitry is part of the ToF system or the imaging unit of the ToF system.

Determining the first and second region of interest may include object detection, tracking information, etc. The corresponding pixel areas are set accordingly.

This may reduce a computational load of the application processor.

Some embodiments pertain to a (corresponding) mode sequencing method for a time-of-flight system, the time-of-flight system including at least an imaging unit and an illumination unit, the imaging unit having a data bus interface for transmitting data to an application processor over a data bus, the mode sequencer method including:

setting a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest.

The mode sequencing method may be based on or may be implemented by electronic components, integrated circuitry logic, CPU, FPGA, software or in parts by electronic components and in parts by software executed by a processor or the like. The method may also be performed by the mode sequencer circuitry, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Some embodiments pertain to a time of flight system, the time-of-flight system including:

an illumination unit including a light source configured to illuminate a scene (as discussed herein);

an optical lens portion configured to image light reflected by the scene onto an imaging unit (as discussed herein);

the imaging unit including an image sensor configured to generate image data representing a time-of-flight measurement in accordance with the light imaged onto the image sensor and a data bus interface for transmitting data to an application processor over a data bus;

a mode sequencer circuitry (as discussed herein) configured to set a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on the application processor for analyzing the first region of interest and the second output mode is adapted in accordance with a second limitation of the data bus interface and at least one requirement of a second sub-program running on the application processor for analyzing the second region of interest; and the application processor.

Returning to FIG. 3, there is schematically illustrated in a block diagram a first embodiment of a mode sequencer circuitry 33-1 for a time-of-flight system 20-1, which is discussed in the following under reference of FIG. 3.

The iToF system 20-1 is a full-field iToF system for providing a distance measurement. The iToF system 20-1 is embedded in a vehicle 21 for in-cabin passenger monitoring. The iToF system 20-1 and the vehicle 21 are illustrated separately fur illustration purposes only. The iToF system 20-1 may be arranged, for instance, in a middle console or at the ceiling close to the front window of the vehicle 21.

The iToF system 20-1 includes an illumination unit 22, an imaging unit 23-1 and an optical lens portion 24.

The imaging unit 23-1 includes a control unit 25-1 and an image sensor 26.

The illumination unit 22, including an LED array as a light source, emits intensity-modulated light (in time) to a scene (illuminates the scene) that is a cabin of the vehicle 21, which includes a first region of interest 27, a second region of interest **28*a* and 28*b*, and a third region of interest 29*a* and 29*b*. Objects and persons (not shown) in the regions of interest 27, 28*a* and 28*b*, and 29*a* and 29*b* reflect at least part of the (illumination) light. The reflected light from the objects and persons is imaged by the optical lens portion 24 onto the image sensor 26**.

The control unit 25-1 controls the overall operation of the iToF system 20-1. The control unit 25-1 controls the light emission timing of the illumination unit 22 based on a modulation signal (which may be a rectangular modulation signal having a modulation period T, i.e. a modulation frequency fmod=1/T) provided to the illumination unit 22. The control unit 25-1 applies a demodulation signal to the image sensor 26 which corresponds to the modulation signal provided to the illumination unit 22.

The image sensor 26 generates image data including pixel values of a plurality of pixels in accordance with an amount of reflected light imaged by the optical lens portion 24 onto the image sensor (or the imaging unit 23-1) and in accordance with the demodulation signal. The control unit reads out the image data generated by the image sensor 6.

The imaging unit 23-1 has a data bus interface for transmitting the generated image data over a data bus (interface) 30 to an application processor 31-1 of the vehicle 21. Here, the data bus 30 is a data bus in accordance with MIPI CSI-2 specification.

The application processor 31-1 includes an application unit 32, the mode sequencer circuitry 33-1, an image processing unit 34-1 and a 3D image reconstruction unit 35. The application unit 32 may perform further high-level functions such as memory management, graphics processing, multimedia decoding and encoding, etc.

The application unit 32 executes a first sub-program 32*a*, a second sub-program 32*b* and a third sub-program 32*c* (in the other words, the sub-programs 32*a*, 32*b* and 32*c* run on the application processor 31-1).

The first sub-program 32*a* analyzes the first region of interest 27, the second sub-program 32*b* analyzes the second region of interest 28*a* and 28*b*, and the third sub-program 32*c* analyzes the third region of interest 29*a* and 29*b*.

The first sub-program 32*a* is a program analyzing a body pose of passengers in the vehicle 21 (body pose recognition), the second sub-program 32*b* is a program analyzing a face of the passengers on front seats of the vehicle 21 (face recognition), and the third sub-program 32*c* is a program analyzing a gesture of the passengers on the front seats of the vehicle 21 (gesture recognition).

Here, the mode sequencer circuitry is implemented based on a software executed by or running on the application processor 31-1.

The mode sequencer circuitry 33-1 sets a first, a second and a third output mode of the imaging unit 23-1 for outputting first, second and third image data over the data bus 30 to the application processor 31-1.

The first output mode is associated with the first region of interest 27 that is imaged by the imaging unit 23-1, the second output mode is associated with the second region of interest 28*a* and 28*b* that is imaged by the imaging unit 23-1, and the third output mode is associated with the third region of interest 29*a* and 29*b* that is imaged by the imaging unit 23-1.

The first output mode is adapted in accordance with a first limitation of the data bus interface 30 and at least one requirement of the first sub-program 32*a* running on the application processor 31-1 for analyzing the first region of interest 27, the second output mode is adapted in accordance with a second limitation of the data bus interface 30 and at last one requirement of the second sub-program 32*b* running on the application processor 31-1 for analyzing the second region of interest 28*a* and 28*b*, and the third output mode is adapted in accordance with a third limitation of the data bus interface 30 and at last one requirement of the third sub-program 32*c* running on the application processor 31-1 for analyzing the third region of interest 29*a* and 29*b*.

Here, the first, second and third limitations are the same, which is a maximum possible image data amount that can be transmitted over the data bus 30. A concrete example will be discussed under reference of FIG. 6 further below.

The at least one requirement of the first sub-program 32*a*, the second sub-program 32*b*, and the third sub-program 32*c* may be a frame rate of the image data and a spatial (and depth, or depth) resolution of the image data.

The image processing unit 34-1 is used by the first, second and third sub-program (32*a*, 32*b*, 32*c*) for image data processing. The image processing unit 34-1 obtains the image data output by the imaging unit 23-1 in accordance with the first, second and third output modes which were transmitted from the imaging unit 23-1 over the data bus 30 to the application processor 31-1. The image processing unit 34-1 determines, based on the obtained image data, a phase-shift of the detected reflected light with respect to the emitted light. Then, the image processing unit 34-1 calculates a distance d or generally depth information for the respective region of interest (27, 28*a* and 28*b*, 29*a* and 29*b*) based on the determined phase-shift.

The 3D image reconstruction unit 35 is used by the first, second and third sub-program (32*a*, 32*b*, 32*c*) for constructing a 3D image, 3D depth map or 3D point cloud of the respective region of interest (27, 28*a* and 28*b*, 29*a* and 29*b*) based on the depth information from the image processing unit 34-1.

Figure 4:
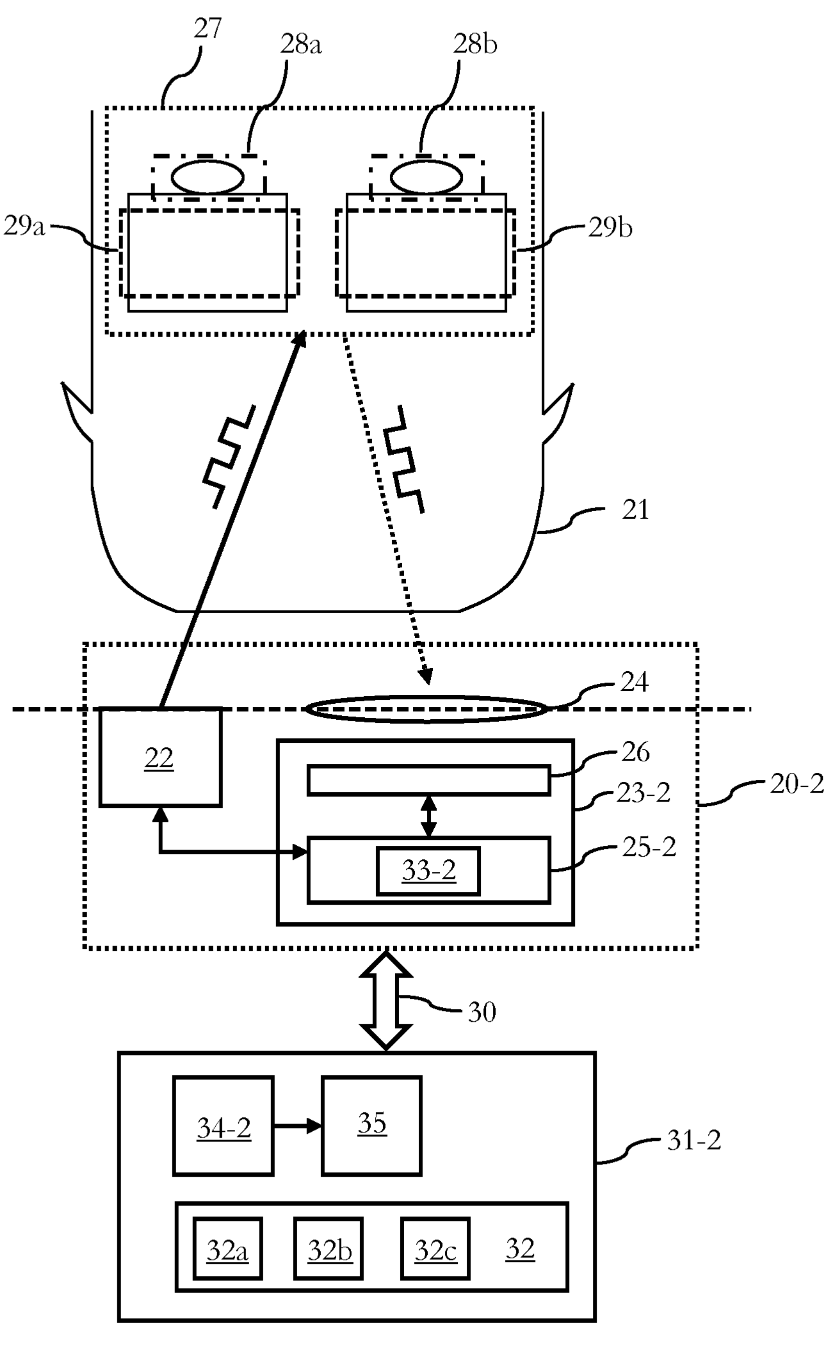
FIG. 4 schematically illustrates in a block diagram a second embodiment of a mode sequencer circuitry for a time-of-flight system.

FIG. 4 schematically illustrates in a block diagram a second embodiment of a mode sequencer circuitry 33-2 for a time-of-flight system 20-2, which is discussed in the following under reference of FIG. 4.

Basically, the present second embodiment of FIG. 4 corresponds to the first embodiment as discussed with reference to FIG. 3 and, thus, the differences between the first and the second embodiment will be discussed.

The iToF system 20-2 includes an illumination unit 22, an imaging unit 23-2 and an optical lens portion 24. The imaging unit 23-2 includes a control unit 25-2 and an image sensor 26.

While in the first embodiment of FIG. 3 the mode sequencer circuitry 33-1 is implemented based on a software executed by or running on the application processor 31-1, the mode sequencer circuitry 33-2 of the present second embodiment is implemented as hardware, e.g., an integrated circuit or FPGA in the control unit 25-2.

Moreover, the mode sequencer circuitry 33-2 obtains the first, second and the third image data in accordance with the first, second and third output modes of the imaging unit 23-2.

Then, the mode sequencer circuitry 33-2 calculates first, second and third component data, based on the obtained first, second and third image data.

Then, the mode sequencer circuitry 33-2 transmits either the obtained first image data or the calculated first component data in accordance with the first limitation of the data bus interface 30 and the at least one requirement of the first sub-program 32*a* to an application processor 31-2, either the obtained second image data or the calculated second component data in accordance with the second limitation of the data bus interface 30 and the at least one requirement of the second sub-program 32*b* to the application processor 31-2, and either the obtained third image data or the calculated third component data in accordance with the third limitation of the data bus interface 30 and the at least one requirement of the third sub-program 32*c* to the application processor 31-2.

Furthermore, an image processing unit 34-2 in the application processor 31-2 which is used by the first, second and third sub-program (32*a*, 32*b*, 32*c*) for image data processing, obtains either the image data or the component data for image data processing in accordance with a data output format (image data or component data).

Figure 5:
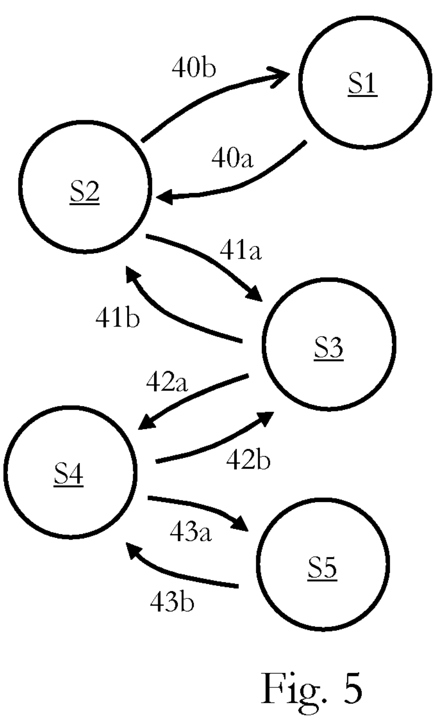
FIG. 5 schematically illustrates an embodiment of vehicle states of a vehicle.

FIG. 5 schematically illustrates an embodiment of vehicle states of the vehicle 21 of the embodiments of FIGS. 3 and 4, which is discussed in the following under reference of FIG. 5.

The vehicle 21 of the embodiments of FIGS. 3 and 4 is in one of vehicle states S1, S2, S3, S4 and S5.

The state S1 corresponds to a parked state (e.g. the vehicle 21 is parked and no passenger is inside), the state S2 corresponds to an entering/leaving state, the state S3 corresponds to a preparing/ending drive state, the state S4 corresponds to a parking state (e.g. a driver parks the vehicle 21) and the state S5 corresponds to a driving state (e.g. a driver drives the vehicle 21 on a road, the driver accelerates the vehicle 21, etc.).

The state S1 transits, at 40*a*, to the state S2 when, e.g., a passenger enters the vehicle 21. The state S2 transits, at 40*b*, to the state S1 when, e.g., the vehicle 21 is parked and the passenger leaves the vehicle 21.

The state S2 transits, at 41*a*, to the state S3 when, e.g., a driver fastens a seat belt, turns on an engine, etc. The state S3 transits, at 41*b*, to the state S2 when, e.g., the engine is turned off, etc.

The state S3 transits, at 42*a*, to the state S4 when, e.g., the driver starts driving the vehicle 21 out of a parking lot. The state S4 transits, at 42*b*, to the state S3 when, e.g., the driver is parking the vehicle 21 in the parking lot.

The state S4 transits, at 43*a*, to the state S5 when, e.g., the vehicle 21 has left the parking lot and drives on a road. The state S5 transits, at 43*b*, to the state S4 when, e.g., the driver starts parking the vehicle 21 in the parking lot.

In each of the vehicle states S1, S2, S3, S4 and S5 an application processor (e.g. application processors 31-1 and 31-2) may execute different sub-programs for analyzing image data or depth information of an associated region of interest and the sub-programs may have different requirements for the image data, as discussed herein. Moreover, the region of interest analyzed by the sub-programs may depend on the vehicle state S1, S2, S3, S4 or S5.

For example, in state S1, a sub-program may only require analyzing whether someone is entering the vehicle 21 but power consumption should be small. For example, in state S2, a sub-program may require identifying a face identity of a passenger entering the vehicle 21. For example, in state S3, a sub-program may require recognizing a body pose (e.g. for recognizing whether the driver fastens the seat belt) or a gesture (e.g. if gesture-based operation of the vehicle 21 is enabled). For example, in state S4, a sub-program may require recognizing whether the driver's hands are on the steering wheel. For example, in state S5, a sub-program may require recognizing in real-time a body pose of the driver and a facial expression (e.g. for recognizing whether the driver is tired) for advanced driver assistance features of the vehicle 21, a gesture recognition for infotainment control, or the like.

Figure 6:
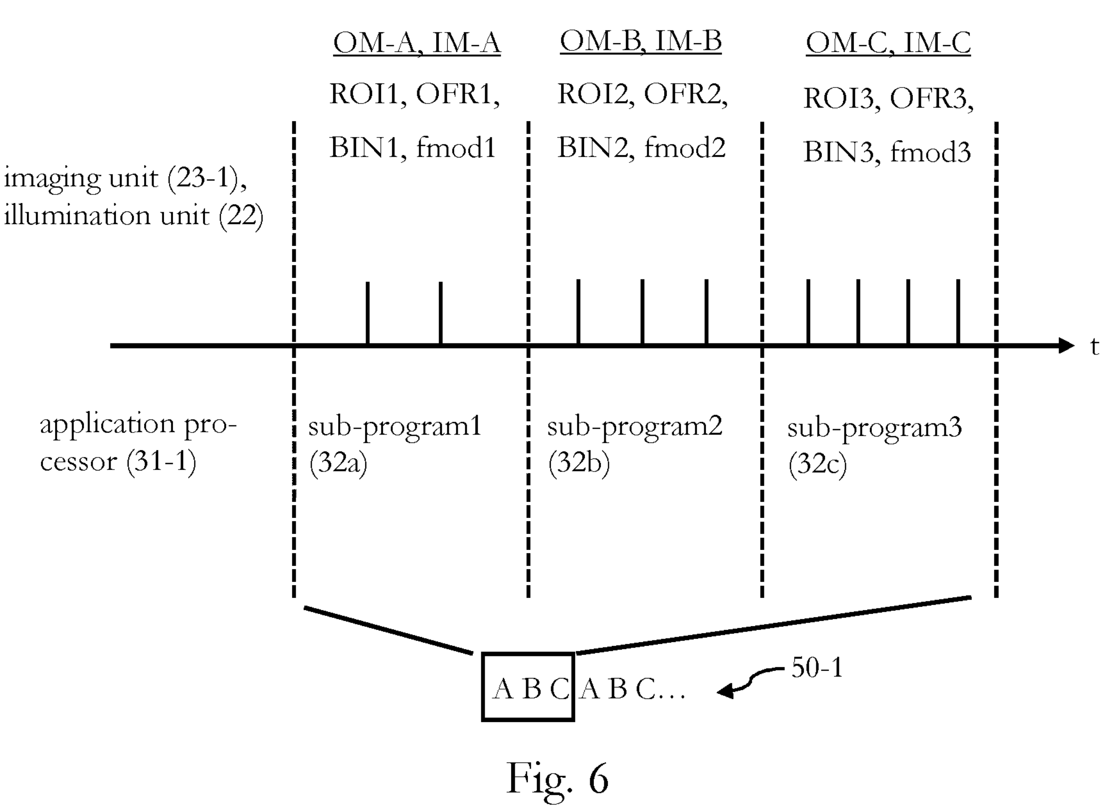
FIG. 6 schematically illustrates a first embodiment of a sequence of output modes and illumination modes.

FIG. 6 schematically illustrates a first embodiment of a sequence 50-1 of output modes (OM-A, OM-B, OM-C) and illumination modes (IM-A, IM-B, IM-C), which is discussed in the following under reference of FIG. 6.

The present embodiment is based on the first embodiment of the mode sequencer circuitry 33-1 discussed under reference of FIG. 3, wherein the vehicle 21 is in a driving state S5 as discussed with reference to FIG. 5.

The mode sequencer circuitry 33-1 of the embodiment sets the sequence 50-1 of output modes (OM-A, OM-B, OM-C) of the imaging unit 23-1 and illumination modes (IM-A, IM-B, IM-C) of the illumination unit 22.

Even though the embodiments of FIGS. 3 and 6 refer to three output modes, the present disclosure is not limited to three output modes (and illumination modes) or any specific number of output modes if at least two output modes (and illumination modes) are set. Moreover, the present embodiment is not limited to the specific timeline of the sequence 50-1 or any other specific sequence of output modes, for example, also sequences such as ACBACB . . . or BCABCA . . . or ABCB . . . or ABCBDBCB . . . are possible.

Here, a lower part of FIG. 6 illustrates a timeline of sub-programs (32*a*, 32*b*, 32*c*) running on the application processor 31-1 analyzing the regions of interest (27, 28*a* and 28*b*, 29*a* and 29*b*).

The first sub-program 32*a* is a program analyzing a body pose of passengers in the vehicle 21 (body pose recognition) in the first region of interest 27, the second sub-program 32*b* is a program analyzing a face or facial expression of the passengers on front seats of the vehicle 21 (face recognition) in the second region of interest 28*a* and 28*b*, and the third sub-program 32*c* is a program analyzing a gesture of the passengers on the front seats of the vehicle 21 (gesture recognition) in the third region of interest 29*a* and 29*b*.

Here, an upper part of FIG. 6 illustrates a timeline of the set output modes (OM-A, OM-B, OM-C) of the imaging unit 23-1 and the set illumination modes (IM-A, IM-B, IM-C) of the illumination unit 22 during the set output modes (OM-A, OM-B, OM-C), wherein the dashed lines indicate a change of the sub-program and the corresponding output mode.

At first, the first sub-program 32*a* for body pose recognition is executed. The first output mode OM-A of the imaging unit 23-1 for outputting first image data over the data bus 30 is set by the mode sequencer circuitry 33-1, wherein the first output mode OM-A is associated with the first region of interest 27 analyzed by the first sub-program 32*a*.

The mode sequencer circuitry 33-1 sets the output mode parameters of the first output mode OM-A: ROI1 (first region of interest 27), first output frame rate (OFR1) and first binning (BIN1). The mode sequencer circuitry 33-1 sets the illumination mode parameters of the first illumination mode IM-A during the first output mode OM-A: first illumination region corresponding to ROI1 and a first modulation frequency fmod1. The first output frame rate OFR1 is illustrated schematically by the black lines in the timeline.

The imaging unit 23-1 outputs the first image data in accordance with the first imaging mode OM-A.

Then, the second sub-program 32*b* for face recognition is executed. The second output mode OM-B of the imaging unit 23-1 for outputting second image data over the data bus 30 is set by the mode sequencer circuitry 33-1, wherein the second output mode OM-B is associated with the second region of interest 28*a* and 28*b* analyzed by the second sub-program 32*b*.

The mode sequencer circuitry 33-1 sets the output mode parameters of the second output mode OM-B: ROI2 (second region of interest 28*a* and 28*b*), second output frame rate (OFR2) and second binning (BIN2). The mode sequencer circuitry 33-1 sets the illumination mode parameters of the second illumination mode IM-B during the second output mode OM-B: second illumination region corresponding to ROI2 and a second modulation frequency fmod2. The second output frame rate OFR2 is illustrated schematically by the black lines in the timeline.

The imaging unit 23-1 outputs the second image data in accordance with the second imaging mode OM-B.

Then, the third sub-program 32*c* for gesture recognition is executed. The third output mode OM-C of the imaging unit 23-1 for outputting third image data over the data bus 30 is set by the mode sequencer circuitry 33-1, wherein the third output mode OM-C is associated with the third region of interest 29*a* and 29*b* analyzed by the third sub-program 32*c*.

The mode sequencer circuitry 33-1 sets the output mode parameters of the third output mode OM-C: ROI3 (third region of interest 29*a* and 29*b*), third output frame rate (OFR3) and third binning (BIN3). The mode sequencer circuitry 33-1 sets the illumination mode parameters of the third illumination mode IM-C during the third output mode OM-C: third illumination region corresponding to ROI3 and a third modulation frequency fmod3. The third output frame rate OFR3 is illustrated schematically by the black lines in the timeline.

The imaging unit 23-1 outputs the third image data in accordance with the third imaging mode OM-C.

The output modes (OM-A, OM-B, OM-C) are set in accordance with at least one limitation of the data bus 30. Here, the at least one limitation is a maximum possible image data amount that can be transmitted over the data bus 30.

The first output frame rate OFR1 is set lower than the second output frame rate OFR 2 which is set lower than the third output frame rate OFR3 (OFR1<OFR2<OFR3) in accordance with at least one requirement of the respective sub-programs, since body pose recognition may require a lower output frame rate OFR1 than face recognition (OFR2) and gesture recognition requires the highest output frame rate OFR3.

The first binning BIN1 and the third binning BIN3 are set equal (BIN1=BIN3=2×2 pixel), while the second binning BIN2 is set to one (BIN2=1×1 pixel), since body pose recognition and gesture recognition may require a lower spatial resolution than face recognition which requires the highest spatial resolution.

The first modulation frequency fmod1 is set larger than the third modulation frequency fmod3 which is set larger than the second modulation frequency fmod2 (fmod1>fmod3>fmod2), since body pose recognition may require the highest depth resolution, while face recognition may require the lowest depth resolution.

Accordingly, the output modes (OM-A, OM-B, OM-C) are optimized under the limitation of the maximum possible image data amount that can be transmitted over the data bus 30 by making in each of the output modes (OM-A, OM-B, OM-C) a trade-off, based on the requirement(s) of the respective sub-program, between time resolution (OFR1-3), spatial resolution (BIN1-3) and depth resolution (fmod1-3) of the image data.

Hence, the first output mode OM-A is adapted in accordance with the limitation of the data bus interface 30 and at least one requirement of the first sub-program 32*a* running on the application processor 31-1 for analyzing the first region of interest (27, ROI1), the second output mode OM-B is adapted in accordance with the limitation of the data bus interface 30 and at last one requirement of the second sub-program 32*b* running on the application processor 31-1 for analyzing the second region of interest (28*a* and 28*b*, ROI2), and the third output mode OM-C is adapted in accordance with the limitation of the data bus interface 30 and at last one requirement of the third sub-program 32*c* running on the application processor 31-1 for analyzing the third region of interest (29*a* and 29*b*, ROI3).

Moreover, the first illumination region of the illumination unit 22 is set in the first illumination mode IM-A corresponding to the first region of interest (27, ROI1), the second illumination region of the illumination unit 22 is set in the second illumination mode IM-B corresponding to the second region of interest (28*a* and 28*b*, ROI2), and the third illumination region of the illumination unit 22 is set in the third illumination mode IM-C corresponding to the third region of interest (29*a* and 29*b*, ROI3).

Furthermore, the first modulation frequency fmod1 of the illumination unit 22 is set in the first illumination mode IM-A in accordance with the at least one requirement of the first sub-program 32*a*, the second modulation frequency fmod2 of the illumination unit 22 is set in the second illumination mode IM-B in accordance with the at least one requirement of the second sub-program 32*b*, and the third modulation frequency fmod3 of the illumination unit 22 is set in the third illumination mode IM-C in accordance with the at least one requirement of the third sub-program 32*c*.

Figure 7:
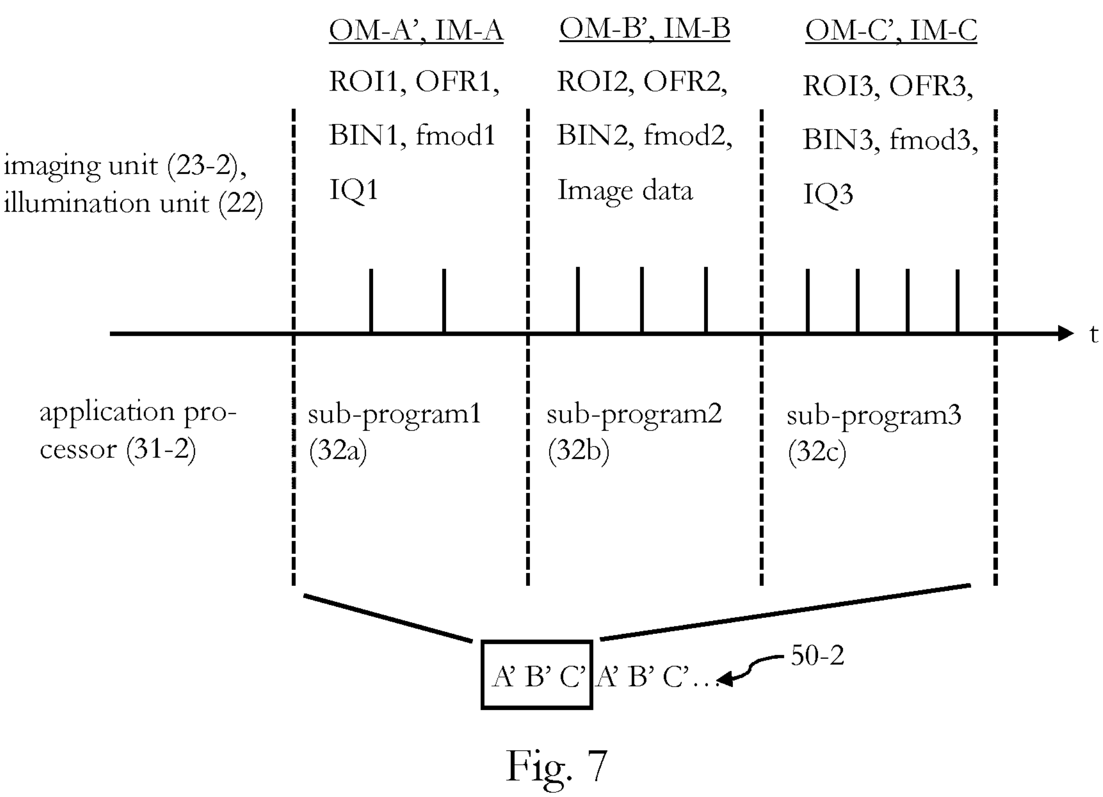
FIG. 7 schematically illustrates a second embodiment of a sequence of output modes and illumination modes.

FIG. 7 schematically illustrates a second embodiment of a sequence 50-2 of output modes (OM-A', OM-B', OM-C') and illumination modes (IM-A, IM-B, IM-C), which is discussed in the following under reference of FIG. 7.

The present embodiment is based on the second embodiment of the mode sequencer circuitry 33-2 discussed under reference of FIG. 4, wherein the vehicle 21 is in a driving state S5 as discussed with reference to FIG. 5.

The mode sequencer circuitry 33-2 of the embodiment sets the sequence 50-2 of output modes (OM-A', OM-B', OM-C') of the imaging unit 23-2 and illumination modes (IM-A, IM-B, IM-C) of the illumination unit 22, which basically corresponds to the sequence 50-1 of the embodiment discussed with reference to FIG. 6, but the difference between them will be discussed in the following.

In the present second embodiment, the mode sequencer circuitry 33-2 further obtains the first, second and third image data in accordance with the first (OM-A'), second (OM-B') and third (OM-C') output mode of the imaging unit 23-2.

In the first (OM-A') and third (OM-C') output mode, the mode sequencer circuitry calculates first and third component data (IQ1, IQ3), based on the obtained first and the obtained third image data.

In the first output mode OM-A', the mode sequencer circuitry transmits the calculated first component data IQ1 in accordance with the at least one requirement of the first sub-program 32*a*, since the first region of interest (27, ROI1) covers the full field-of-view which is analyzed by the first sub-program 32*a* and, thus, preprocessing before transmission may reduce the computational load on the application processor 31-2.

In the third output mode OM-C', the mode sequencer circuitry transmits the calculated third component data IQ3 in accordance with the at least one requirement of the third sub-program 32*c*, since the gesture recognition performed by the third sub-program 32*c* requires the highest output frame rate OFR3 and, thus, preprocessing before transmission may reduce the computational load on the application processor 31-2.

While in the second output mode OM-B', the mode sequencer circuitry transmits the second image data in accordance with the at least one requirement of the second sub-program 32*b*.

Figure 8:
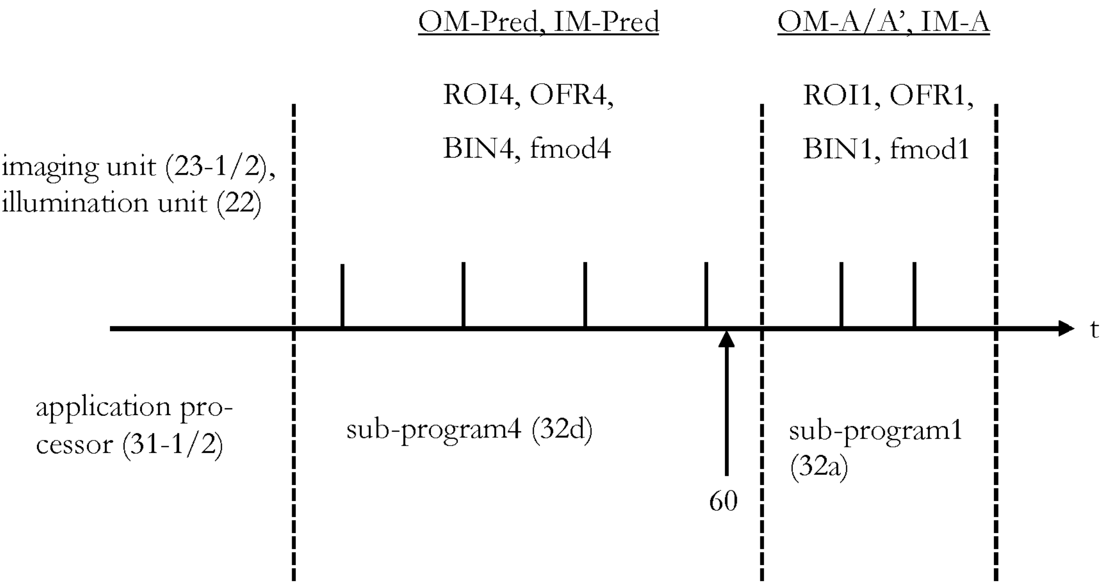
FIG. 8 schematically illustrates an embodiment of a predetermined output mode.

FIG. 8 schematically illustrates an embodiment of a predetermined output mode (OM-Pred) and predetermined illumination mode (IM-Pred), which is discussed in the following under reference of FIG. 8.

The present embodiment is based on the first and second embodiment of the mode sequencer circuitry 33-1 and 33-2 discussed under reference of FIGS. 3 and 4, respectively, wherein the vehicle 21 is initially in an entering/leaving state S2 as discussed with reference to FIG. 5.

Initially, the vehicle 21 is in the entering/leaving state S2, that is a driver has parked the vehicle 21 but is still inside the vehicle 21.

Then, the driver leaves the vehicle 21 and the vehicle 21 transits to the parked state S1.

In response to the state transition, the application processor issues a command and the mode sequencer circuitry

33-1/2 obtains the command and sets the imaging unit 23-1/2 to a predetermined output mode OM-Pred, based on the obtained command from the application processor 31-1/2. Moreover, the mode sequencer circuitry 33-1/2 sets the illumination unit 22 to a predetermined illumination mode IM-Pred.

In response to the state transition, the application processor 31-1/2 executes a fourth sub-program **32*d* analyzing a fourth region of interest ROI4. The fourth region of interest includes door windows of the vehicle 21. The fourth sub-program 32*d* analyzes whether a person approaches and enters the vehicle 21. The predetermined output mode OM-Pred is associated with the fourth region of interest (ROI4**).

The mode sequencer circuitry 33-1/2 sets the output mode parameters of the predetermined output mode OM-Pred: ROI4, fourth output frame rate (OFR4) and fourth binning (BIN4). The mode sequencer circuitry 33-1/2 sets the illumination mode parameters of the predetermined illumination mode IM-Pred during the predetermined output mode OM-Pred: predetermined illumination region corresponding to ROI4 and a fourth modulation frequency fmod4. The fourth output frame rate OFR4 is illustrated schematically by the black lines in the timeline.

The fourth output frame rate OFR4 is set lower than the OFR1-3, the fourth binning BIN4 is set larger than the BIN1-3 and the fourth modulation frequency fmod4 is set smaller than the fmod1-3, since the fourth sub-program **32*d* may require only a low output frame rate OFR4 (low time resolution), a low spatial resolution (BIN4 large) and a low depth resolution (fmod4** low).

When the fourth sub-program **32*d* recognizes a person approaching and entering the vehicle 21, the application processor 31-1/2 issues a wake-up interrupt 60**.

Then, the vehicle 21 transits to the entering/leaving state S2.

In response to the state transition, the application processor 31-1/2 executes, for example, the first sub-program **32*a*** (it may, however, execute any other sub-program or sequence of sub-programs).

In response to the wake-up interrupt 60, the mode sequencer circuitry 33-1/2 sets the first output mode OM-A/A' of the imaging unit 23-1/2 and the first illumination mode IM-A/A' of the illumination unit 22 during the first output mode OM-A/A'.

FIG. 9 schematically illustrates in a flow diagram a first embodiment of a mode sequencing method 200 (which may be, for example, implemented in an application processor or a time-of-flight system of the present disclosure).

At 201, a first and a second output mode of an imaging unit is set for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest, as discussed herein.

At 202, a first output frame rate of the first image data is set in the first output mode in accordance with the first limitation of the data bus interface and the at least one requirement of the first sub-program and a second output frame rate of the second image data is set in the second output mode in accordance with the second limitation of the data bus interface and the at least one requirement of the second sub-program, as discussed herein.

At 203, a first binning of the first image data is set in the first output mode in accordance with the first limitation of the data bus interface and the at least one requirement of the first sub-program and a second binning of the second image data is set in the second output mode in accordance with the second limitation of the data bus interface and the at least one requirement of the second sub-program, as discussed herein.

At 204, a first and a second illumination mode of an illumination unit is set during the first and the second output mode of the imaging unit, respectively, wherein a first illumination region of the illumination unit is set in the first illumination mode corresponding to the first region of interest and a second illumination region of the illumination unit is set in the second illumination mode corresponding to the second region of interest, as discussed herein.

At 205, a first modulation frequency of the illumination unit is set in the first illumination mode in accordance with the at least one requirement of the first sub-program and a second modulation frequency of the illumination unit is set in the second illumination mode in accordance with the at least one requirement of the second sub-program, as discussed herein.

FIG. 10 schematically illustrates in a flow diagram a second embodiment of a mode sequencing method 300 (which may be, for example, implemented in a time-of-flight system of the present disclosure).

At 301, the steps 201 to 205 of the embodiment discussed under reference of FIG. 9 are performed (and are included here by incorporation of reference in order to avoid unnecessary repetitions).

At 302, the first and the second image data is obtained in accordance with the first and the second output modes of the imaging unit, as discussed herein.

At 303, first and second component data is calculated, based on the obtained first and the obtained second image data, as discussed herein.

At 304, either the obtained first image data or the calculated first component data is transmitted in accordance with the first limitation of the data bus interface and the at least one requirement of the first sub-program and either the obtained second image data or the calculated second component data is transmitted in accordance with the second limitation of the data bus interface and the at least one requirement of the second sub-program, as discussed herein.

At 305, the first and the second region of interest is determined, based on the obtained first image data or the first calculated component data and the second image data or the calculated second component data, as discussed herein.

At 306, the first and the second region of interest is set in accordance with the determined first and second region of interest, as discussed herein.

FIG. 11 schematically illustrates in a flow diagram a third embodiment of a mode sequencing method 400 (which may be, for example, implemented in an application processor or a time-of-flight system of the present disclosure).

At 401, the steps 201 to 205 of the embodiment discussed under reference of FIG. 9 are performed (and are included here by incorporation of reference in order to avoid unnecessary repetitions).

At 402, the first and the second region of interest is set based on preset information, as discussed herein.

At 403, a predetermined output mode is set, based on a command obtained from the application processor, until a wake-up interrupt occurs, as discussed herein.

FIG. 12 schematically illustrates in a flow diagram a fourth embodiment of a mode sequencing method 500 (which may be, for example, implemented in an application processor or a time-of-flight system of the present disclosure).

At 501, the steps 201 to 205 of the embodiment discussed under reference of FIG. 9 are performed (and are included here by incorporation of reference in order to avoid unnecessary repetitions).

At 502, the first and the second region of interest is set based on tracking information obtained from the application processor, as discussed herein.

Figure 13:
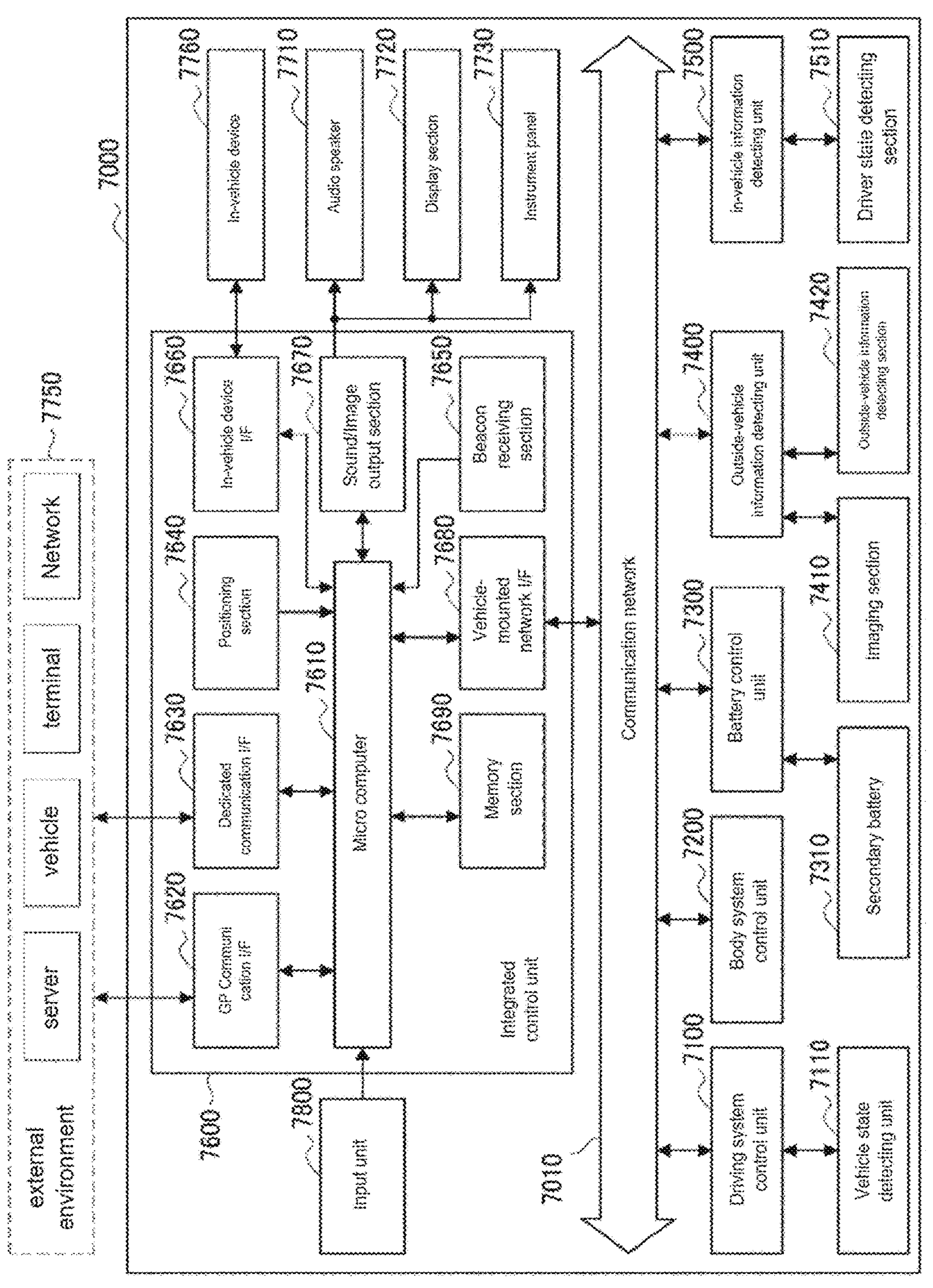
FIG. 13 schematically illustrates in a block diagram an embodiment of a schematic configuration of a vehicle control system.

FIG. 13 schematically illustrates in a block diagram an embodiment of a schematic configuration of a vehicle control system 7000 for a vehicle such as the vehicle 21 of the embodiments according to FIGS. 3 and 4.

FIG. 13 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 13, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

The in-vehicle information detecting unit 7500 may include a time-of-flight system, a mode sequencer circuitry and an application processor in accordance with the present disclosure.

Each of the control units includes: a microcomputer (including e.g. an application processor) that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F (including e.g. a MIPI CSI-2 interface) for performing communication with a device, a sensor, or the like within and without the vehicle by wire communication or radio communication. A functional configuration of the integrated control unit 7600 illustrated in FIG. 13 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 14:
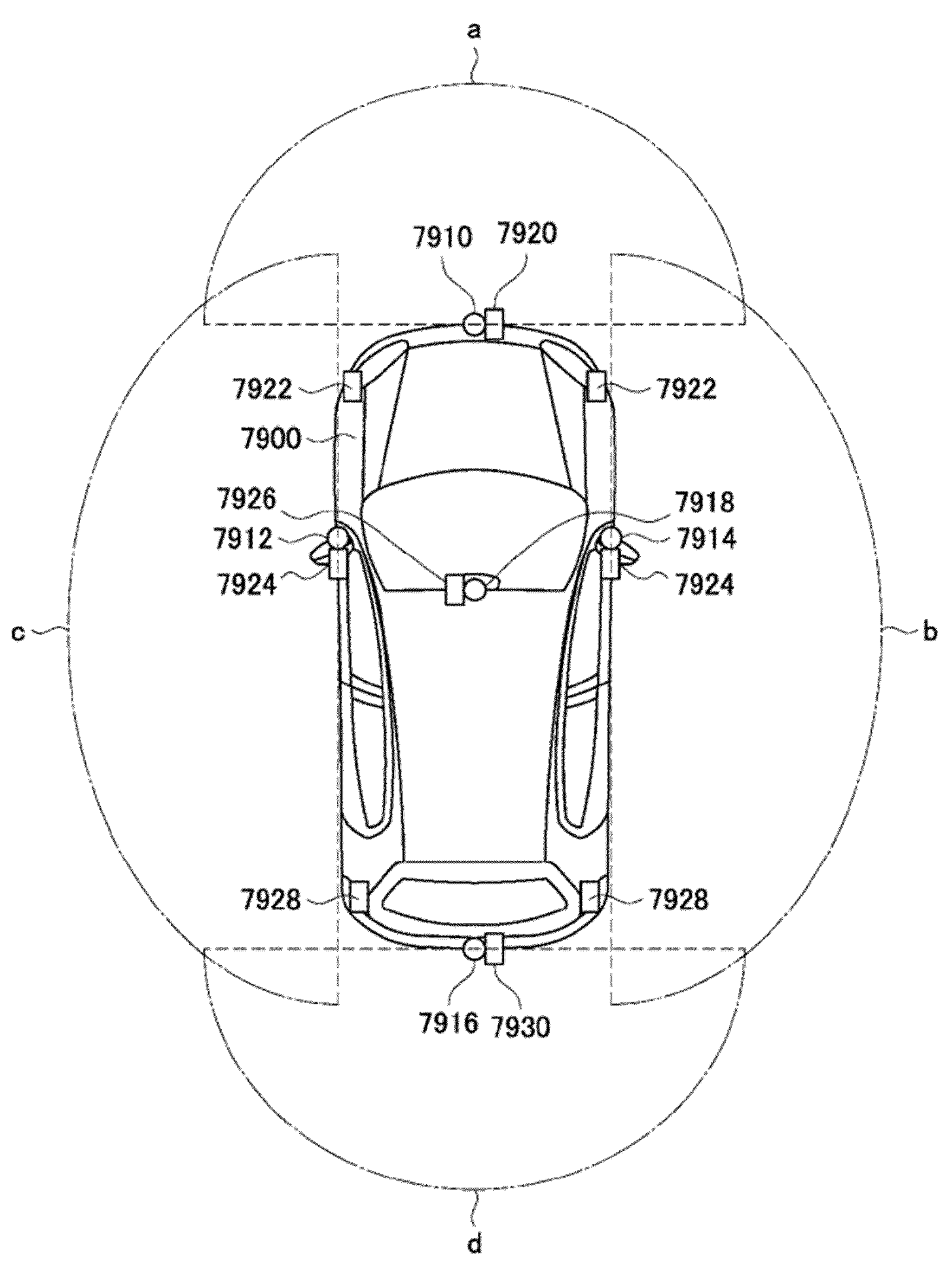
FIG. 14 schematically illustrates a diagram of assistance in explaining an embodiment of installation positions of an outside-vehicle information detecting section and an imaging section.

FIG. 14 schematically illustrates a diagram of assistance in explaining an embodiment of installation positions of an outside-vehicle information detecting section 7420 and the imaging section 7410.

Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 13, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 may include a time-of-flight system, a mode sequencer circuitry and an application processor in accordance with the present disclosure. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 13, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 13 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It should be recognized that the embodiments describe methods with an exemplary ordering of method steps. The specific ordering of method steps is however given for illustrative purposes only and should not be construed as binding. For example, the ordering of 200 and 203 in the embodiment of FIG. 9 may be exchanged. Also, the ordering of 203, 204 and 205 in the embodiment of FIG. 9 may be exchanged. Other changes of the ordering of method steps may be apparent to the skilled person.

Please note that the division of the application processor 31-1 into units 32 to 35 is only made for illustration purposes and that the present disclosure is not limited to any specific division of functions in specific units.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A mode sequencer circuitry for a time-of-flight system, the time-of-flight system including at least an imaging unit and an illumination unit, the imaging unit having a data bus interface for transmitting data to an application processor over a data bus, the mode sequencer circuitry being configured to:

set a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest.

(2) The mode sequencer circuitry of (1), wherein a first output frame rate of the first image data is set in the first output mode in accordance with the first limitation of the data bus interface and the at least one requirement of the first sub-program and a second output frame rate of the second image data is set in the second output mode in accordance with the second limitation of the data bus interface and the at least one requirement of the second sub-program.

(3) The mode sequencer circuitry of (1) or (2), wherein a first binning of the first image data is set in the first output mode in accordance with the first limitation of the data bus interface and the at least one requirement of the first sub-program and a second binning of the second image data is set in the second output mode in accordance with the second limitation of the data bus interface and the at least one requirement of the second sub-program.

(4) The mode sequencer circuitry of anyone of (1) to (3), wherein the mode sequencer circuitry is further configured to set a first and a second illumination mode of the illumination unit during the first and the second output mode of the imaging unit, respectively, wherein a first illumination region of the illumination unit is set in the first illumination mode corresponding to the first region of interest and a second illumination region of the illumination unit is set in the second illumination mode corresponding to the second region of interest.

(5) The mode sequencer circuitry of (4), wherein a first modulation frequency of the illumination unit is set in the first illumination mode in accordance with the at least one requirement of the first sub-program and a second modulation frequency of the illumination unit is set in the second illumination mode in accordance with the at least one requirement of the second sub-program.

(6) The mode sequencer circuitry of anyone of (1) to (5), wherein the mode sequencer circuitry is further configured to:

obtain the first and the second image data in accordance with the first and the second output modes of the imaging unit;

calculate first and second component data, based on the obtained first and the obtained second image data; and transmit either the obtained first image data or the calculated first component data in accordance with the first limitation of the data bus interface and the at least one requirement of the first sub-program and either the obtained second image data or the calculated second component data in accordance with the second limitation of the data bus interface and the at least one requirement of the second sub-program.

(7) The mode sequencer circuitry of anyone of (1) to (6), wherein the first and the second region of interest is set based on preset information.

(8) The mode sequencer circuitry of anyone of (1) to (6), wherein the first and the second region of interest is set based on tracking information obtained from the application processor.

(9) The mode sequencer circuitry of (6), wherein the mode sequencer circuitry is further configured to:

determine the first and the second region of interest, based on the obtained first image data or the first calculated component data and the second image data or the calculated second component data; and set the first and the second region of interest in accordance with the determined first and second region of interest.

(10) The mode sequencer circuitry of anyone of (1) to (9), wherein the mode sequencer circuitry is further configured to set a predetermined output mode, based on a command obtained from the application processor, until a wake-up interrupt occurs.

(11) A mode sequencing method for a time-of-flight system, the time-of-flight system including at least an imaging unit and an illumination unit, the imaging unit having a data bus interface for transmitting data to an application processor over a data bus, the mode sequencer method including:

setting a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on an application processor for analyzing the first region of interest and the second output mode is adapted in accordance with a second limitation of the data bus interface and at least one requirement of a second sub-program running on the application processor for analyzing the second region of interest.

(12) The mode sequencing method of (11), wherein a first output frame rate of the first image data is set in the first output mode in accordance with the first limitation of the data bus interface and the at least one requirement of the first sub-program and a second output frame rate of the second image data is set in the second output mode in accordance with the second limitation of the data bus interface and the at least one requirement of the second sub-program.

(13) The mode sequencing method of (11) or (12), wherein a first binning of the first image data is set in the first output mode in accordance with the first limitation of the data bus interface and the at least one requirement of the first sub-program and a second binning of the second image data is set in the second output mode in accordance with the second limitation of the data bus interface and the at least one requirement of the second sub-program.

(14) The mode sequencing method of anyone of (11) to (13), further including:

setting a first and a second illumination mode of the illumination unit during the first and the second output mode of the imaging unit, respectively, wherein a first illumination region of the illumination unit is set in the first illumination mode corresponding to the first region of and a second illumination region of the illumination unit is set in the second illumination mode corresponding to the second region of interest.

(15) The mode sequencing method of (14), wherein a first modulation frequency of the illumination unit is set in the first illumination mode in accordance with the at least one requirement of the first sub-program and a second modulation frequency of the illumination unit is set in the second illumination mode in accordance with the at least one requirement of the second sub-program.

(16) The mode sequencing method of anyone of (11) to (15), further including:

obtaining the first and the second image data in accordance with the first and the second output modes of the imaging unit;

calculating first and second component data, based on the obtained first and the obtained second image data; and transmitting either the obtained first image data or the calculated first component data in accordance with the first limitation of the data bus interface and the at least one requirement of the first sub-program and either the obtained second image data or the calculated second component data in accordance with the second limitation of the data bus interface and the at least one requirement of the second sub-program.

(17) The mode sequencing method of anyone of (11) to (16), wherein the first and the second region of interest is set based on preset information.

(18) The mode sequencing method of anyone of (11) to (16), wherein the first and the second region of interest is set based on tracking information obtained from the application processor.

(19) The mode sequencing method of (16), further including:

determining the first and the second region of interest, based on the obtained first image data or the first calculated component data and the second image data or the calculated second component data; and setting the first and the second region of interest in accordance with the determined first and second region of interest.

(20) The mode sequencing method of anyone of (11) to (19), further including:

setting a predetermined output mode, based on a command obtained from the application processor, until a wake-up interrupt occurs.

(21) A time of flight system, the time-of-flight system including:

an illumination unit including a light source configured to illuminate a scene;

an optical lens portion configured to image light reflected by the scene onto an imaging unit;

the imaging unit including an image sensor configured to generate image data representing a time-of-flight measurement in accordance with the light imaged onto the image sensor and a data bus interface for transmitting data to an application processor over a data bus;

a mode sequencer circuitry configured to set a first and a second output mode of the imaging unit for outputting first and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on the application processor for analyzing the first region of interest and the second output mode is adapted in accordance with a second limitation of the data bus interface and at least one requirement of a second sub-program running on the application processor for analyzing the second region of interest; and the application processor.

(22) A computer program comprising program code causing a computer to perform the method according to anyone of (11) to (20), when being carried out on a computer.

(23) A non-transitory computer-readable recording medium that stores therein a computer program product, which, when executed by a processor, causes the method according to anyone of (11) to (20) to be performed.

The invention claimed is:

1. A mode sequencer apparatus for a time-of-flight system, the time-of-flight system comprising at least an imaging unit and an illumination unit, the imaging unit having a data bus interface for transmitting data to an application processor over a data bus, the mode sequencer apparatus comprising:

circuitry configured to set a first output mode and a second output mode of the imaging unit for outputting first image data and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on the application processor for analyzing the first region of interest and the second output mode is adapted in accordance with a second limitation of the data bus interface and at least one requirement of a second sub-program running on the application processor for analyzing the second region of interest, wherein the circuitry is configured to set the first output mode in accordance with the first sub-program being executed so as to output the first image data over the data bus interface, wherein the circuitry is configured to set the second output mode in accordance with the second sub-program being executed so as to output the second image data over the data bus interface, wherein a first output frame rate of the first image data is set in the first output mode in accordance with the first limitation of the data bus interface and the at least one requirement of the first sub-program, wherein a second output frame rate of the second image data is set in the second output mode in accordance with the second limitation of the data bus interface and the at least one requirement of the second sub-program, wherein the first output frame rate is set lower than the second output frame rate, wherein the circuitry is configured to obtain the first image data in accordance with the first output mode having the first output frame rate that is set lower than the second output frame rate before obtaining the second image data in accordance with the second output mode having the second output frame rate in accordance with the first sub-program being executed before the second sub-program, wherein the circuitry is configured to obtain the second image data in accordance with the second output mode having the second output frame rate that is set higher than the first output frame rate before obtaining the first image data in accordance with the first output mode having the first output frame rate in accordance with the second sub-program being executed before the first sub-program, and wherein the circuitry is configured to set a sequence including the first output mode and the second output mode in accordance with a preset sequence including the first sub-program and the second sub-program in accordance with the at least one requirement of the first sub-program and the at least one requirement of the second sub-program before:

obtaining the first image data in accordance with the first output mode, and obtaining the second image data in accordance with the second output mode.

2. The mode sequencer apparatus according to claim 1, wherein a first binning of the first image data is set in the first output mode in accordance with the first limitation of the data bus interface and the at least one requirement of the first sub-program, and a second binning of the second image data is set in the second output mode in accordance with the second limitation of the data bus interface and the at least one requirement of the second sub-program.

3. The mode sequencer apparatus according to claim 1, wherein the circuitry is further configured to set a first illumination mode and a second illumination mode of the illumination unit during the first output mode and the second output mode of the imaging unit, respectively, a first illumination region of the illumination unit is set in the first illumination mode corresponding to the first region of interest, and a second illumination region of the illumination unit is set in the second illumination mode corresponding to the second region of interest.

4. The mode sequencer apparatus according to claim 3, wherein a first modulation frequency of the illumination unit is set in the first illumination mode in accordance with the at least one requirement of the first sub-program, and a second modulation frequency of the illumination unit is set in the second illumination mode in accordance with the at least one requirement of the second sub-program.

5. The mode sequencer apparatus according to claim 1, wherein the circuitry is further configured to:

calculate first component data and second component data based on the obtained first and the obtained second image data;

transmit either the obtained first image data or the calculated first component data in accordance with the first limitation of the data bus interface and the at least one requirement of the first sub-program; and transmit either the obtained second image data or the calculated second component data in accordance with the second limitation of the data bus interface and the at least one requirement of the second sub-program.

6. The mode sequencer apparatus according to claim 5, wherein the circuitry is further configured to:

determine the first region of interest and the second region of interest based on the obtained first image data or the first calculated component data and the second image data or the calculated second component data; and set the first region of interest and the second region of interest in accordance with the determined first region of interest and the determined second region of interest.

7. The mode sequencer apparatus according to claim 1, wherein the first region of interest and the second region of interest are set based on preset information.

8. The mode sequencer circuitry according to claim 1, wherein the first region of interest and the second region of interest are set based on tracking information obtained from the application processor.

9. The mode sequencer apparatus according to claim 1, wherein the circuitry is further configured to set a predetermined output mode, based on a command obtained from the application processor, until a wake-up interrupt occurs.

10. A mode sequencing method for a time-of-flight system, the time-of-flight system including at least an imaging unit and an illumination unit, the imaging unit having a data bus interface for transmitting data to an application processor over a data bus, the method comprising:

setting a first output mode and a second output mode of the imaging unit for outputting first image data and second image data over the data bus interface, wherein the first output mode is associated with a first region of interest being imaged by the imaging unit and the second output mode is associated with a second region of interest being imaged by the imaging unit, wherein the first output mode is adapted in accordance with a first limitation of the data bus interface and at least one requirement of a first sub-program running on the application processor for analyzing the first region of interest and the second output mode is adapted in accordance with a second limitation of the data bus interface and at least one requirement of a second sub-program running on the application processor for analyzing the second region of interest, wherein the setting includes:

setting the first output mode in accordance with the first sub-program being executed so as to output the first image data over the data bus interface, and setting the second output mode in accordance with the second sub-program being executed so as to output the second image data over the data bus interface, wherein a first output frame rate of the first image data is set in the first output mode in accordance with the first limitation of the data bus interface and the at least one requirement of the first sub-program, wherein a second output frame rate of the second image data is set in the second output mode in accordance with the second limitation of the data bus interface and the at least one requirement of the second sub-program, wherein the first output frame rate is set lower than the second output frame rate, and wherein the method further comprises:

obtaining the first image data in accordance with the first output mode having the first output frame rate that is set lower than the second output frame rate before obtaining the second image data in accordance with the second output mode having the second output frame rate in accordance with the first sub-program being executed before the second sub-program, obtaining the second image data in accordance with the second output mode having the second output frame rate that is set higher than the first output frame rate before obtaining the first image data in accordance with the first output mode having the first output frame rate in accordance with the second sub-program being executed before the first sub-program, and setting a sequence including the first output mode and the second output mode in accordance with a preset sequence including the first sub-program and the second sub-program in accordance with the at least one requirement of the first sub-program and the at least one requirement of the second sub-program before:

obtaining the first image data in accordance with the first output mode, and obtaining the second image data in accordance with the second output mode.

11. The mode sequencing method according to claim 10, wherein a first binning of the first image data is set in the first output mode in accordance with the first limitation of the data bus interface and the at least one requirement of the first sub-program, and a second binning of the second image data is set in the second output mode in accordance with the second limitation of the data bus interface and the at least one requirement of the second sub-program.

12. The mode sequencing method according to claim 10, further comprising:

setting a first illumination mode and a second illumination mode of the illumination unit during the first output mode and the second output mode of the imaging unit, respectively, wherein a first illumination region of the illumination unit is set in the first illumination mode corresponding to the first region of interest, and a second illumination region of the illumination unit is set in the second illumination mode corresponding to the second region of interest.

13. The mode sequencing method according to claim 12, wherein a first modulation frequency of the illumination unit is set in the first illumination mode in accordance with the at least one requirement of the first sub-program, and a second modulation frequency of the illumination unit is set in the second illumination mode in accordance with the at least one requirement of the second sub-program.

14. The mode sequencing method according to claim 10, further comprising:

calculating first component data and second component data based on the obtained first and the obtained second image data;

transmitting either the obtained first image data or the calculated first component data in accordance with the first limitation of the data bus interface and the at least one requirement of the first sub-program; and transmitting either the obtained second image data or the calculated second component data in accordance with the second limitation of the data bus interface and the at least one requirement of the second sub-program.

15. The mode sequencing method according to claim 14, further comprising:

determining the first region of interest and the second region of interest based on the obtained first image data or the first calculated component data and the second image data or the calculated second component data; and setting the first region of interest and the second region of interest in accordance with the determined first region of interest and the determined second region of interest.

16. The mode sequencing method according to claim 10, wherein the first region of interest and the second region of interest are set based on preset information.

17. The mode sequencing method according to claim 10, wherein the first region of interest and the second region of interest are set based on tracking information obtained from the application processor.

18. The mode sequencing method according to claim 10, further comprising:

setting a predetermined output mode, based on a command obtained from the application processor, until a wake-up interrupt occurs.

* * * * *